US009336184B2

(12) United States Patent
Mital et al.

(10) Patent No.: US 9,336,184 B2
(45) Date of Patent: May 10, 2016

(54) REPRESENTATION OF AN INTERACTIVE DOCUMENT AS A GRAPH OF ENTITIES

(75) Inventors: Vijay Mital, Kirkland, WA (US); Darryl Ellis Rubin, Duvall, WA (US); David G. Green, Redmond, WA (US); Suraj T. Poozhiyil, Redmond, WA (US); Gary Shon Katzenberger, Fall City, WA (US); Olivier Colle, Bellevue, WA (US); Brian C. Beckman, Newcastle, WA (US); Krasimir A. Aleksandrov, Kirkland, WA (US); Andrew D. Reddish, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 248 days.

(21) Appl. No.: 12/972,205

(22) Filed: Dec. 17, 2010

(65) Prior Publication Data

US 2012/0159312 A1 Jun. 21, 2012

(51) Int. Cl.
*G06F 17/00* (2006.01)
*G06F 17/21* (2006.01)
*G06F 17/24* (2006.01)

(52) U.S. Cl.
CPC .............. *G06F 17/21* (2013.01); *G06F 17/246* (2013.01)

(58) Field of Classification Search
CPC .. G06F 17/30017; G06F 17/246; G06F 17/21
USPC .......................................... 715/201, 210, 215
See application file for complete search history.

(56) References Cited

U.S. PATENT DOCUMENTS

| 4,633,430 | A | 12/1986 | Cooper |
| 5,669,007 | A | 9/1997 | Tateishi |
| 5,867,714 | A | 2/1999 | Todd et al. |
| 6,326,962 | B1 | 12/2001 | Szabo |
| 6,662,355 | B1 * | 12/2003 | Caswell et al. ............... 717/103 |
| 6,691,100 | B1 | 2/2004 | Alavi et al. |
| 6,865,720 | B1 | 3/2005 | Otani |
| 6,931,589 | B2 | 8/2005 | Baltsan |
| 6,995,768 | B2 | 2/2006 | Jou et al. |

(Continued)

OTHER PUBLICATIONS

Dr. Bjarne Berg, A comprehensive guide to SAP NetWeaver Visual Composer, 2009, SAP insider. pp. 1-81.*

(Continued)

*Primary Examiner* — Scott Baderman
*Assistant Examiner* — Howard Cortes
(74) *Attorney, Agent, or Firm* — Jessica Meyers; Tom Wong; Micky Minhas

(57) ABSTRACT

Techniques for representing and publishing an interactive document useful for analyzing data. The document may be represented as a directed acyclic graph of entities interconnected by edges. The entities may be of multiple types. Yet, a broad range of interactive documents may be represented by a limited number of types of entities and the capabilities to interconnect entities of different types and to share a data schema across entities of different types. A tool may enable a user to author such documents. The tool may also facilitate publishing of the document. For publishing, the document may be converted to an executable form. Prior to such a conversion, the graph may be modified for more efficient processing. The graph may also be partitioned such that portions of the graph, when distributed across tiers of a computing system, such as a cloud-based platform, execute on computing devices that provide efficient operation.

20 Claims, 13 Drawing Sheets

(56) References Cited

U.S. PATENT DOCUMENTS

| | | | |
|---|---|---|---|
| 7,028,306 B2 | 4/2006 | Boloker et al. | |
| 7,263,663 B2 | 8/2007 | Ballard et al. | |
| 7,263,694 B2 | 8/2007 | Clewis et al. | |
| 7,315,305 B2 | 1/2008 | Crotty et al. | |
| 7,315,861 B2 | 1/2008 | Seibel et al. | |
| 7,343,585 B1* | 3/2008 | Lau et al. | 717/108 |
| 7,349,947 B1 | 3/2008 | Slage et al. | |
| 7,440,902 B2 | 10/2008 | Greenstein et al. | |
| 7,506,243 B2 | 3/2009 | Kotler et al. | |
| 7,603,620 B2 | 10/2009 | Erol | |
| 7,672,950 B2 | 3/2010 | Eckardt, III et al. | |
| 7,752,314 B2 | 7/2010 | Trevor et al. | |
| 7,752,536 B2 | 7/2010 | Megiddo et al. | |
| 7,774,791 B1 | 8/2010 | Appelbaum et al. | |
| 7,802,230 B1* | 9/2010 | Mendicino et al. | 717/113 |
| 7,870,545 B2 | 1/2011 | Saha et al. | |
| 7,900,111 B1 | 3/2011 | Kim et al. | |
| 7,908,186 B2 | 3/2011 | Gabelmann et al. | |
| 7,941,791 B2 | 5/2011 | Wang et al. | |
| 8,032,875 B2 | 10/2011 | Kosche et al. | |
| 8,117,606 B2 | 2/2012 | Chakrabarti et al. | |
| 8,135,655 B2 | 3/2012 | Oaten et al. | |
| 8,201,160 B2 | 6/2012 | Hauser | |
| 8,301,585 B2 | 10/2012 | Mourey et al. | |
| 8,332,772 B2 | 12/2012 | Janzen et al. | |
| 8,429,630 B2 | 4/2013 | Nickolov et al. | |
| 8,473,473 B2 | 6/2013 | Wang et al. | |
| 8,589,172 B2 | 11/2013 | Alonso et al. | |
| 8,635,211 B2 | 1/2014 | Jiang et al. | |
| 8,713,058 B2 | 4/2014 | Nagoski et al. | |
| 2001/0047372 A1* | 11/2001 | Gorelik et al. | 707/514 |
| 2002/0065673 A1 | 5/2002 | Rooke | |
| 2002/0066782 A1 | 6/2002 | Swaminathan et al. | |
| 2002/0091609 A1 | 7/2002 | Markowski | |
| 2002/0169658 A1 | 11/2002 | Adler | |
| 2002/0191199 A1 | 12/2002 | Imada et al. | |
| 2003/0040962 A1 | 2/2003 | Lewis | |
| 2003/0041104 A1 | 2/2003 | Wingard et al. | |
| 2003/0144868 A1 | 7/2003 | MacIntyre | |
| 2004/0015481 A1 | 1/2004 | Zinda | |
| 2004/0098358 A1 | 5/2004 | Roediger | |
| 2004/0148586 A1* | 7/2004 | Gilboa | 717/108 |
| 2004/0153992 A1 | 8/2004 | Molina-Moreno et al. | |
| 2004/0162842 A1 | 8/2004 | Ono | |
| 2004/0181519 A1* | 9/2004 | Anwar | 707/3 |
| 2005/0004911 A1* | 1/2005 | Goldberg et al. | 707/7 |
| 2005/0043961 A1 | 2/2005 | Torres et al. | |
| 2005/0187809 A1 | 8/2005 | Falkenhainer | |
| 2005/0231392 A1 | 10/2005 | Meehan et al. | |
| 2005/0257157 A1* | 11/2005 | Gilboa et al. | 715/747 |
| 2006/0037019 A1 | 2/2006 | Austin et al. | |
| 2006/0074882 A1 | 4/2006 | Scherer et al. | |
| 2006/0080400 A1 | 4/2006 | Guha | |
| 2007/0005477 A1 | 1/2007 | McAtamney | |
| 2007/0013697 A1* | 1/2007 | Gilboa | 345/440 |
| 2007/0038657 A1 | 2/2007 | Denton et al. | |
| 2007/0046664 A1* | 3/2007 | Raspl et al. | 345/420 |
| 2007/0061711 A1 | 3/2007 | Bodin et al. | |
| 2007/0094609 A1* | 4/2007 | Gilboa et al. | 715/762 |
| 2007/0112714 A1 | 5/2007 | Fairweather | |
| 2007/0118394 A1 | 5/2007 | Cahoon | |
| 2007/0124285 A1 | 5/2007 | Wright et al. | |
| 2007/0136326 A1 | 6/2007 | Mcclement et al. | |
| 2007/0153706 A1* | 7/2007 | Melcher et al. | 370/254 |
| 2007/0179941 A1 | 8/2007 | Huang et al. | |
| 2007/0185746 A1 | 8/2007 | Chieu et al. | |
| 2007/0250764 A1 | 10/2007 | Jiang et al. | |
| 2007/0265995 A1 | 11/2007 | Remington et al. | |
| 2007/0294614 A1 | 12/2007 | Jacquin et al. | |
| 2008/0040346 A1 | 2/2008 | Aggarwal et al. | |
| 2008/0058969 A1* | 3/2008 | Nixon et al. | 700/87 |
| 2008/0120111 A1* | 5/2008 | Doyle | 704/270 |
| 2008/0127052 A1 | 5/2008 | Rostoker | |
| 2008/0178083 A1 | 7/2008 | Bergman et al. | |
| 2008/0183710 A1 | 7/2008 | Serjeantson et al. | |
| 2008/0184140 A1 | 7/2008 | Koerner | |
| 2008/0184167 A1 | 7/2008 | Berrill et al. | |
| 2008/0189438 A1 | 8/2008 | Zimmerer et al. | |
| 2008/0195930 A1* | 8/2008 | Tolle | 715/227 |
| 2008/0209314 A1 | 8/2008 | Sylthe et al. | |
| 2008/0215559 A1 | 9/2008 | Fontoura et al. | |
| 2008/0238925 A1 | 10/2008 | Meehan et al. | |
| 2008/0271127 A1 | 10/2008 | Naibo et al. | |
| 2008/0288889 A1 | 11/2008 | Hunt et al. | |
| 2008/0294996 A1 | 11/2008 | Hunt et al. | |
| 2008/0306981 A1 | 12/2008 | Jiang et al. | |
| 2008/0307334 A1 | 12/2008 | Chaudhri | |
| 2008/0319829 A1 | 12/2008 | Hunt et al. | |
| 2009/0007062 A1* | 1/2009 | Gilboa | 717/105 |
| 2009/0037363 A1 | 2/2009 | Kozlov et al. | |
| 2009/0049422 A1 | 2/2009 | Hage et al. | |
| 2009/0070712 A1* | 3/2009 | Schubert et al. | 715/840 |
| 2009/0094674 A1 | 4/2009 | Schwartz et al. | |
| 2009/0100360 A1 | 4/2009 | Janzen et al. | |
| 2009/0100407 A1 | 4/2009 | Bouillet et al. | |
| 2009/0125553 A1 | 5/2009 | Dickinson | |
| 2009/0138415 A1 | 5/2009 | Lancaster | |
| 2009/0138686 A1* | 5/2009 | Gruetzner et al. | 712/220 |
| 2009/0172024 A1 | 7/2009 | Hsu et al. | |
| 2009/0172773 A1 | 7/2009 | Moore | |
| 2009/0216758 A1 | 8/2009 | Tuttle et al. | |
| 2009/0224941 A1* | 9/2009 | Kansal et al. | 340/870.06 |
| 2009/0225082 A1 | 9/2009 | Hargrove et al. | |
| 2009/0254971 A1 | 10/2009 | Herz et al. | |
| 2009/0287814 A1 | 11/2009 | Robertson et al. | |
| 2009/0300544 A1 | 12/2009 | Psenka et al. | |
| 2009/0312992 A1* | 12/2009 | Chen et al. | 703/2 |
| 2009/0322739 A1 | 12/2009 | Rubin | |
| 2009/0327878 A1 | 12/2009 | Grandison et al. | |
| 2010/0049686 A1 | 2/2010 | Gotz et al. | |
| 2010/0057753 A1 | 3/2010 | Gotz et al. | |
| 2010/0070448 A1 | 3/2010 | Omoigui | |
| 2010/0088258 A1 | 4/2010 | Oaten et al. | |
| 2010/0100561 A1 | 4/2010 | Cooper et al. | |
| 2010/0106853 A1 | 4/2010 | Kashiyama et al. | |
| 2010/0131255 A1 | 5/2010 | Beckman et al. | |
| 2010/0131293 A1 | 5/2010 | Linthicum et al. | |
| 2010/0138231 A1 | 6/2010 | Linthicum et al. | |
| 2010/0138753 A1 | 6/2010 | Riggs et al. | |
| 2010/0145902 A1 | 6/2010 | Boyan et al. | |
| 2010/0179951 A1 | 7/2010 | Mcphail | |
| 2010/0198697 A1 | 8/2010 | Brown et al. | |
| 2010/0199181 A1 | 8/2010 | Robertson et al. | |
| 2010/0205178 A1 | 8/2010 | Bush et al. | |
| 2010/0205238 A1 | 8/2010 | Cao et al. | |
| 2010/0241620 A1 | 9/2010 | Manister et al. | |
| 2010/0287459 A1 | 11/2010 | Mital et al. | |
| 2011/0029636 A1 | 2/2011 | Smyth et al. | |
| 2011/0072000 A1 | 3/2011 | Haas et al. | |
| 2011/0072001 A1 | 3/2011 | Basu et al. | |
| 2011/0072046 A1 | 3/2011 | Chi | |
| 2011/0078101 A1 | 3/2011 | Gotz et al. | |
| 2011/0078160 A1 | 3/2011 | Gotz et al. | |
| 2011/0093430 A1 | 4/2011 | B'Far et al. | |
| 2011/0131253 A1* | 6/2011 | Peukert et al. | 707/805 |
| 2011/0179020 A1 | 7/2011 | Ozzie et al. | |
| 2011/0231385 A1 | 9/2011 | Wang et al. | |
| 2011/0295795 A1 | 12/2011 | Venkatasubramanian et al. | |
| 2011/0295853 A1 | 12/2011 | Li et al. | |
| 2011/0314007 A1 | 12/2011 | Dassa et al. | |
| 2012/0158643 A1 | 6/2012 | Mital et al. | |
| 2012/0158644 A1 | 6/2012 | Mital et al. | |
| 2012/0158732 A1 | 6/2012 | Mital et al. | |
| 2012/0158754 A1 | 6/2012 | Mital et al. | |
| 2012/0159312 A1 | 6/2012 | Mital et al. | |
| 2012/0159333 A1 | 6/2012 | Mital et al. | |
| 2012/0159465 A1 | 6/2012 | Mital et al. | |

OTHER PUBLICATIONS

"Document Processing System"—Published Date: Nov. 16, 2007; http://www.wolfram.com/products/mathematica/analysis/content/DocumentProcessingSystems.html.

(56) References Cited

OTHER PUBLICATIONS

"Introduction to the XML Pipeline Definition Language (XPL)"—Retrieved Date: Sep. 15, 2010; http://www.orbeon.com/orbeon/doc/reference-xpl-pipelines.
"Optimizing forms processing"—Retrieved Date: Sep. 15, 2010; http://www.movetonow.com/content/optimizing_forms_processing.
Frisch, A. et al. "Streaming XML transformations using term rewriting"—Published Date: 2007; http://pauillac.inria.fr/~frisch/xstream/long.pdf.
Gardarin, G. et al. "XML-based Components for Federating Multiple Heterogeneous Data Sources" Lecture Notes in Computer Science—Published Date: 1999; http://dntt.free.fr/publi/er1999.pdf.
Jelinek, J. et al. "XML Visualization Using Tree Rewriting"—Published Date: 2004; http://mummy.intranet.gr/includes/docs/Conferences/_02_XMLvisualization-Jelinek-SCCG04.pdf.
Page, S. "XSL Pipeline Processing"—Published Date: Jul. 2, 2007; http://www.usingxml.com/Transforms/XslPipelines.
"How to Customize Ubuntu into your own custom distribution," Retrieved at <<http://www.linuxquestions.org/questions/ubuntu-63/how-to-customize-ubuntu-into-your-own-custom-distribution-663412/>>, Aug. 17, 2008, 10 pages.
"LeoStatistic—building histogram, curve fit, multivariate regression, data modeling software," Retrieved at <<http://www.leokrut.com/leostatistic.html>>Retrieved Date Sep. 21, 2010, pp. 1-6.
"Publishing applications to market place," Retrieved at <<https://help.creator.zoho.com/Publishing-applications-to-market-place.html>>, Retrieved Date Nov. 26, 2010, pp. 1-5.
"Quella Business Intelligence Package," Retrieved at <<http://www.shareit.com/product.html?cookies=1&productid=300100398&affiliateid=2000122751>>, 1 page.
"Square your search results with Google Squared," Retrieved at <<http://googleblog.blogspot.com/2009/06/square-your-search-results-with-google.html>>, Jun. 2009, pp. 1-4.
"User Customization," Retrieved at <<http://docstore.mik.ua/orelly/perl3/tk/ch16_01.htm>>, Retrieved Date Nov. 26, 2010, pp. 1-4.
"Windows Azure and Cloud Computing," Retrieved at <<http://oakleafblog.blogspot.com/2010/09/windows-azure-and-cloud-computing-posts_09.html>>, Sep. 9, 2010, pp. 1-68.
Ayachit et al., "Customizing ParaView," Retrieved at <<http://www.itk.org/Wiki/images/7/77/Branding_paper.pdf>>, Oct. 2009, 3 pages.
Banerjee, Atanu, "The 2007 Microsoft Office System and Other Platform Technologies for Building Composite Applications," Retrieved at <<http://msdn.microsoft.com/en-us/library/bb220802.aspx>>, Dec. 2006, 14 pages.
Biddick, Michael, "Six Questions to Ask Before Buying End-to-End APM," Retrieved at <<http://www.networkcomputing.com/end-to-end-apm/6-questions-to-ask-before-buying-end-to-end-apm.php>>, Jun. 21, 2010, pp. 1-9.
Collins, J., "Using Innovation in Technology to Create New Business Models," Retrieved at http://www.theshiftonline.com/?p=666>>, Oct. 25, 2010, 3 pages.
Delaney, A., "Direct Data Feed Services," Retrieved at <<http://www.a-teamgroup.com/?dl_id=7460&dl_cm=on&dl_la=0&dl_ls=0, Jun. 2010, 8 pages.
Janeiro, et al., "Improving the Development of Service-Based Applications Through Service Annotations," Retrieved at <<http://www.rn.inf.tu-dresden.de/uploads/Publikationen/AnnotationPaperWWW-Internet2009.pdf>>, 2009, 8 pages.
Johnson, et al., "Building ETL Processes for Business Intelligence Solutions," Retrieved at <<http://www.ca.com/files/whitepapers/ca-erwin-building-etl-processes-sql-wp-us-en.pdf>>, Jul. 10, 2008, 6 pages.
McNee et al., "Creating Auction Ads for Marketplaces," Retrieved at <<http://e-articles.info/e/a/title/Creating-Auction-Ads-for-Marketplaces/>>, Apr. 2007, pp. 1-2.
Mostarda et al., "MU: an hybrid language for Web Mashups," Retrieved at <<http://em-up.googlecode.com/svn/wiki/papers/www2009.pdf>>, 2009, 10 pages.

Nagel, Nick, "Enterprise Data Modeling Using XML Schema," Retrieved at <<http://citeseerx.ist.psu.edu/viewdoc/download?doi=10.1.1.135.6120&rep=rep1&type=pdf>>, 2007, 30 pages.
Ravindran, Karthik, "Integrating LOB Systems with the Microsoft Office System," Retrieved at <<http://msdn.microsoft.com/en-us/library/bb896607.aspx>>Nov. 2007, pp. 1-18.
Spillner et al., "Flexible Human Service Interfaces," Retrieved at <<http://citeseerx.ist.psu.edu/viewdoc/download?doi=10.1.1.70.7734&rep=rep1&type=pdf>>, 2007, 7 pages.
White, Colin J., "IBM enterprise analytics for the intelligent e-business," Retrieved at <<http://sysdoc.doors.ch/IBM/bi.pdf>>, Sep. 2001, 34 pages.
"Non-Final Office Action Issued in U.S. Appl. No. 12/971,685", Mailed Date: Apr. 24, 2014, Filed Date: Dec. 17, 2010, 15 Pages.
"Final Office Action Issued in U.S. Appl. No. 12/971,638", Mailed Date: Feb. 25, 2014, Filed Date: Dec. 17, 2010, 11 Pages.
"Non-final Office Action Issued in U.S. Appl. No. 12/971,725", Mailed Date: Jun. 23, 2014, Filed Date: Dec. 17, 2010, 18 Pages.
"Non-final Office Action in U.S. Appl. No. 12/971,782", Mailed Date: Apr. 10, 2014, Filed Date: Dec. 17, 2010, 10 Pages.
"Non-Final Office Action Issued in U.S. Appl. No. 12/972,249", Mailed Date: Jul. 31, 2014, Filed Date: Dec. 17, 2010, 30 Pages.
"Non-final Office Action in U.S Appl. No. 12/971,638", Mailed Date: Aug. 30, 2012, Filed Date: Dec. 17, 2010, pp. 18.
"Non-final Office Action in U.S. Appl. No. 12/971,685", Mailed Date: Jul. 13, 2012, Filed Date: Dec. 17, 2010, pp. 9.
"Final Office Action in U.S. Appl. No. 12/971,685", Mailed Date: Oct. 11, 2012, Filed Date: Dec. 17, 2010, pp. 16.
"Non-final Office Action in U.S. Appl. No. 12/971,725", Mailed Date: Aug. 21, 2012, Filed Date: Dec. 17, 2010, pp. 10.
"Final Office Action in U.S. Appl. No. 12/971,725", Mailed Date: May 1, 2013, Filed Date: Dec. 17, 2010, pp. 14.
"Non-final Office Action in U.S. Appl. No. 12/971,782", Mailed Date: Jul. 13, 2012, Filed Date: Dec. 17, 2010, pp. 7.
"Final Office Action in U.S. Appl. No. 12/971,782", Mailed Date: Jan. 31, 2013, Filed Date: Dec. 17, 2010, pp. 10.
"Final Office Action in U.S. Appl. No. 12/971,462", Mailed Date: Sep. 18, 2013, Filed Date: Dec. 17, 2010, pp. 24.
"Non-final Office Action in U.S. Appl. No. 12/971,462", Mailed Date: Mar. 21, 2013, Filed Date: Dec. 17, 2010, pp. 21.
"Notice of Allowance Issued in U.S. Appl. No. 12/971,462", Mailed Date: Feb. 26, 2015, 16 Pages.
"Non Final Office Action Issued in U.S. Appl. No. 12/971,638", Mailed Date: Nov. 18, 2014, 12 Pages.
"Non Final Office Action Issued in U.S. Appl. No. 12/971,685", Mailed Date: Nov. 20, 2014, 18 Pages.
"Notice of Allowance Issued in U.S. Appl. No. 12/971,685", Mailed Date: Apr. 8, 2015, 8 Pages.
"Final Office Action Issued in U.S. Appl. No. 12/971,725", Mailed Date: Jan. 15, 2015, 20 Pages.
"Final Office Action Issued in U.S. Appl. No. 12/971,782", Mailed Date: Dec. 4, 2014, 13 Pages.
"Final Office Action Issued in U.S. Appl. No. 12/972,144", Mailed Date: Nov. 20, 2013, 29 Pages.
"Non-Final Office Action Issued in U.S. Appl. No. 12/972,144", Mailed Date: Jun. 9, 2014, 16 Pages.
"Non-Final Office Action Issued in U.S. Appl. No. 12/972,144", Mailed Date: Jan. 14, 2013, 23 Pages.
"Non-Final Office Action Issued in U.S. Appl. No. 12/972,144", Mailed Date: Jul. 9, 2013, 26 Pages.
"Final Office Action Issued in U.S. Appl. No. 12/972,249", Mailed Date: Feb. 6, 2015, 40 Pages.
Cheng, et al., "An Ontology-based Business Intelligence Application in a Financial Knowledge Management System", In Proceedings of the Expert Systems with Applications: An International Journal, vol. 36, Issue 2, Mar. 2009, pp. 3614-3622.
Jing, et al., "Improvement Design on the Data Structure of Business Intelligence", In Future Computer, Communication, Control and Automation, Dec. 2011, pp. 313-321.
Ren, Zhijun., "Practicing for Business Intelligence Application with SQL Server 2008", In Proceedings of the Applied Mechanics and Materials, vol. 20, Jan. 2010, pp. 1499-1503.

(56) References Cited

OTHER PUBLICATIONS

Tory, et al., "Rethinking Visualization: A High-Level Taxonomy", In Proceedings of the IEEE Symposium on Information Visualization, Oct. 10, 2004, pp. 151-158.
Zhang, "A Feasible Enterprise Business Intelligence Design Model", In Proceedings of the International Conference on Management of e-Commerce and e-Government, Sep. 2009, pp. 182-187.
Cheng, et al., "An Ontology-Based Business Intelligence Application in a Financial Knowledge Management System", Journal Expert Systems with Applications: An International Journal archive vol. 36 Issue 2, Mar. 2009, pp. 3614-3622.
Zhang, et al., "A Feasable Enterprise Business Intelligence Design Model", 2009 International Conference on Management of e-Commerce and e-Government, 2009, pp. 182-187.
Jing, et al., "Improvement Design on the Data Structure of Business Intelligence", Future Computer, Communication, control and Automation, AISC 119, 2011, pp. 313-321.
Zhcijun Ren, "Practicing for Business Intelligence Application with SQL Server 2008", Applied Mechanics and Materials vols. 20-23, 2010, pp. 1499-1503.
Evans, Will, "Dynamic Visualization: Introduction & Theory", Available at: http://web.archive.org/web/20090609074938/http://blog.semanticfoundry.com/2009/06/01/dynamic-visualization-introduction-theory, Published on: Jun. 1, 2009, 14 pages.
Hibino, "Processing Incremental Multidimensional Range Queries in a Direct Manipulation Visual Query Environment", In Proceedings of the IEEE 14th International Conference on Data Engineering, Feb. 23, 1998, 8 pages.
Tory, et al., "Rethinking Visualization: A High-Level Taxonomy", Available at: http://citeseerx.ist.psu.edu/viewdoc/download?doi=10.1.1.94.2968&rep=rep1&type=pdf , Published on: Jan. 2005, 8 pages.
Webb, et al., "The In-Context Slider: A Fluid Interface Component for Visualization and Adjustment of Values while Authoring", In Proceedings of the Working Conference on Advanced Visual Interfaces, May 28, 2008, 8 Pages.
Yi, et al., "Dust & Magnet: Multivariate Information Visualization Using a Magnet Metaphor", Information Visualization, vol. 4, Issue 4, 2005, 29 pages.
U.S. Appl. No. 12/971,462, Notice of Allowance Mailed Date: Februrary 26, 2015, p. 13.
Non-final Office Action in U.S Appl. No. 12/971,638, Mailed Date: Nov. 18, 2014, p. 12.
Notice of Allowance in U.S Appl. No. 12/971,638, Mailed Date: Apr. 8, 2015, p. 16.
Non-Final Office Action Issued in U.S. Appl. No. 12/971,685, Mailed Date: Nov. 20, 2014, 17 Pages.
Notice of Allowance Issued in U.S. Appl. No. 12/971,685, Mailed Date: Apr. 8, 2015, 8 pages.
Non-final Office Action in U.S. Appl. No. 14/794,021, Mailed Date: Oct. 7, 2015, p. 14.
Notice of Allowance in U.S. Appl. No. 12/972,249, Mailed Date: Nov. 24, 2015, 15 Pages.
Notice of Allowance Issued in U.S. Appl. No. 12/971,725, Mailed Date: Jun. 18, 2015, 8 pages.
Final Office Action in U.S. Appl. No. 12/971,782, Mailed Date: Dec. 4, 2014, p. 13.
Notice of Allowance in U.S. Appl. No. 12/971,782, Mailed Date: Apr. 2, 2015, p. 10.
Non-final Office Action in U.S Appl. No. 14/790,336, Mailed Date: Oct. 8, 2015, 10 pages.

* cited by examiner

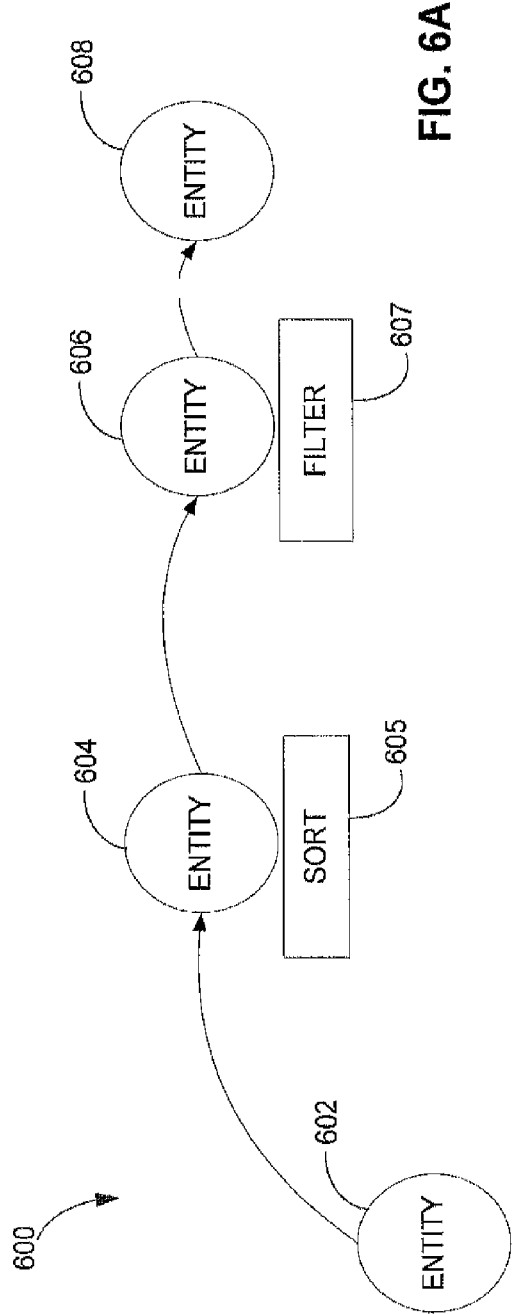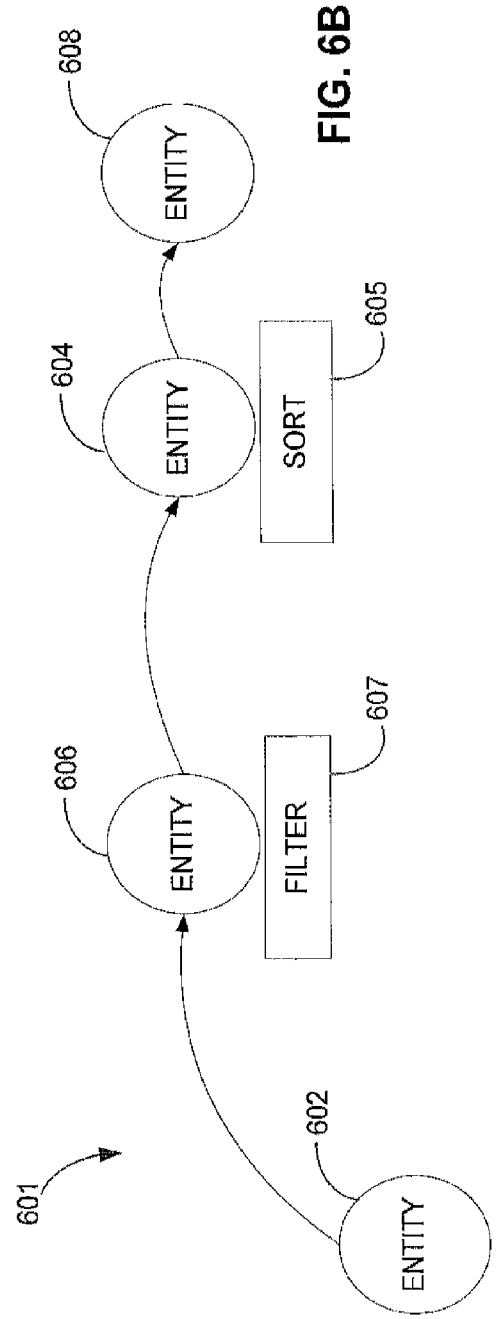

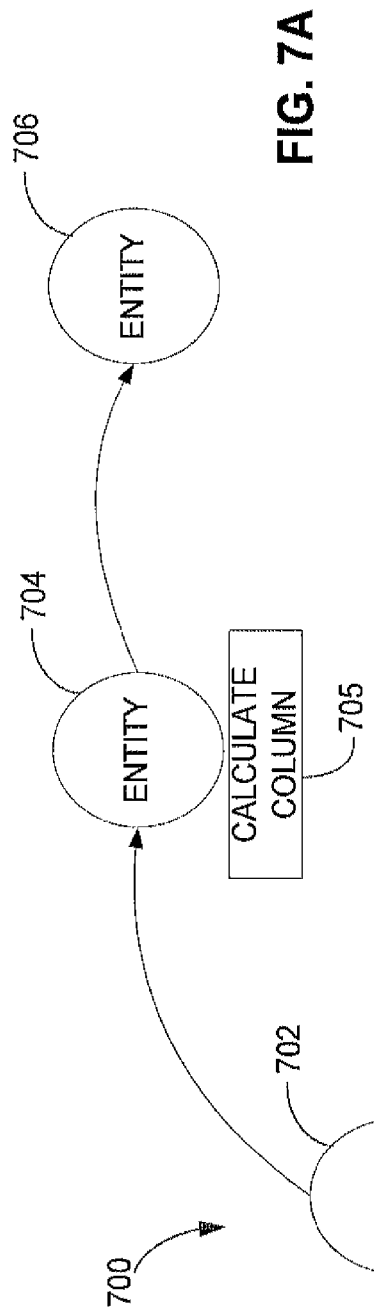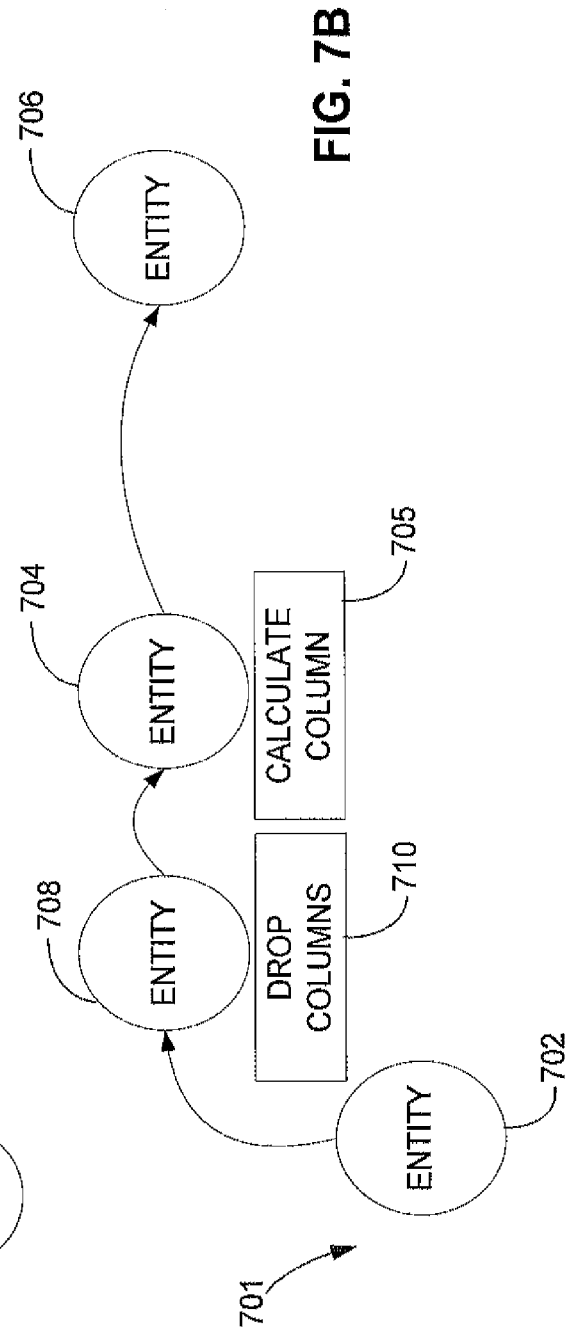

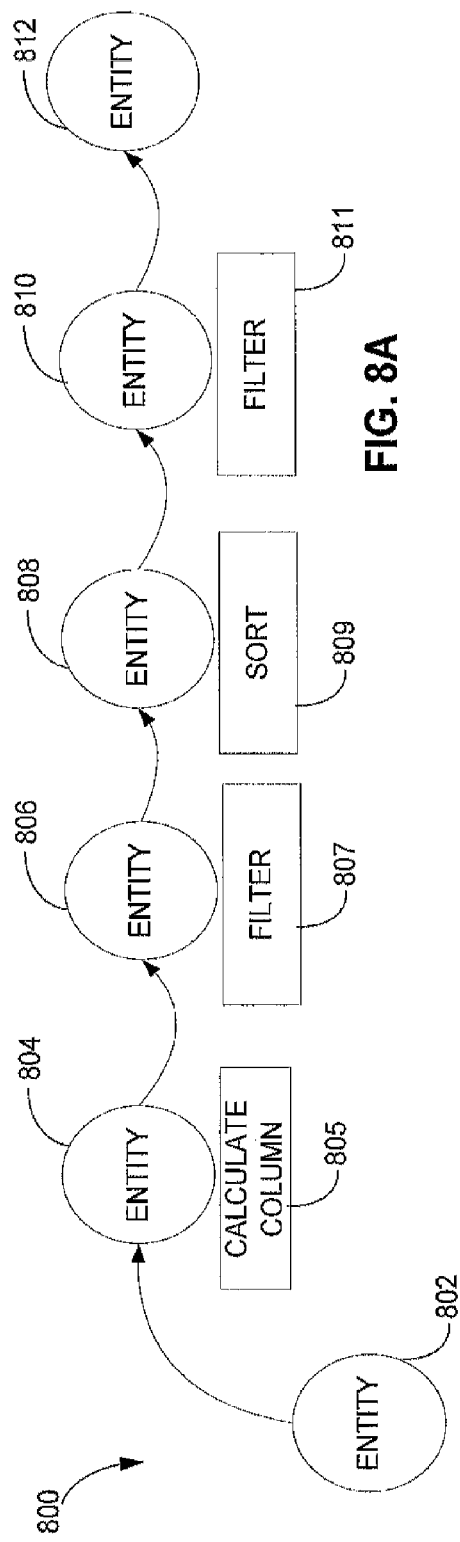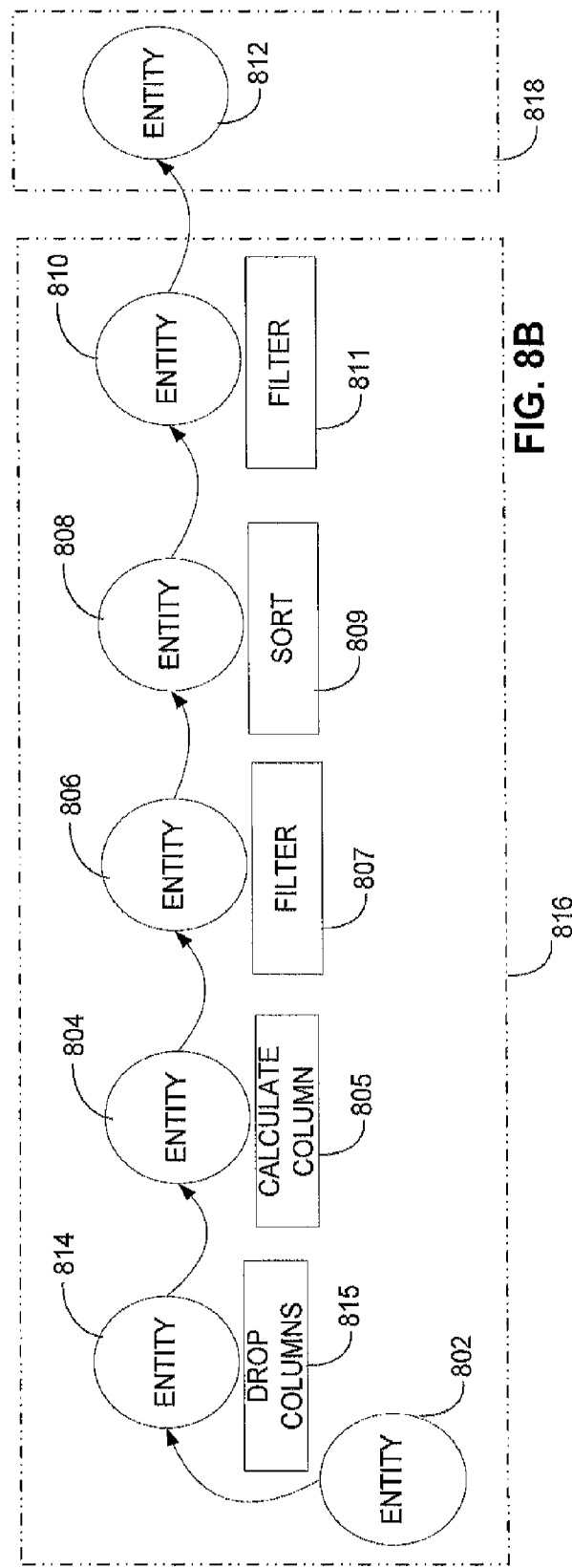
FIG. 8A
FIG. 8B

REPRESENTATION OF AN INTERACTIVE DOCUMENT AS A GRAPH OF ENTITIES

BACKGROUND

The amount of data available for making business and personal decisions has grown rapidly as networking and other communications media have enabled access to large stores of information. To make use of this information, a class of workers, called "information workers" has developed. Information workers are tasked with developing analysis techniques that can be applied to data so that the data can be presented in a way that supports informed decision making.

In some instances, information workers use documents to capture information and knowledge about analysis of that data. Such documents may be of different types. For example, a word processing document may be primarily organized according to paragraphs or sections. Though, a word processing document may include objects, such as tables. In contrast, a spreadsheet document may be organized as a table with rows and columns of cells. Each cell may contain text or numbers. In some instances, cells contain formulas that can compute a value based on values in other cells or other spreadsheets.

These documents can incorporate "visualizations." A visualization may be a graphical object linked to a data set. Values in the data set may control the appearance of visual characteristics of the graphical object when it is rendered on a graphical user interface. Charts are one example of visualizations. For example, the EXCEL spreadsheet program allows a chart to be linked to data in cells of the spreadsheet such that the data is displayed graphically as an embedded object in the spreadsheet.

In some instances, the visualization may be interactive. The visualization may include a control that a user may manipulate to change some aspect of a data set associated with the interactive visualization. A slider is one example of an interactive visualization. The slider may be positioned based on a value in the data set. By interacting through the graphical user interface with the slider, the user may specify a new value for that value in the data set.

Regardless of the specific format of the document, once created, it may be distributed to others who may use it for analyzing data and making decisions. For example, an information worker may create a spreadsheet that captures knowledge about running a department in a large company. The spreadsheet may be distributed to managers of various departments, who may then enter data into cells of the spreadsheet. Each manager may then gain insights related to their department by viewing graphs that have been incorporated into the spreadsheet by the information worker. As one example, managers may view a chart showing profitability of their departments.

SUMMARY

The usefulness of documents for capturing and distributing knowledge may be expanded by providing novel techniques for authoring the document. The document may be defined as a plurality of entities interconnected by edges. Multiple types of entities may be represented in the document, but entities of any type may be interconnected through edges. These entities, for example, may represent a source of external data, a visualization, interactivity of a visualization, or an analytic.

By providing a common framework to represent such disparate entities, bindings may be specified between different types of entities such that, for example, a source of data may be bound to an analytic, a visualization and/or interactivity of a visualization. Moreover, by providing a common framework, a common data schema may be used across multiple types of entities.

A document authoring tool may be provided to receive user inputs defining an interactive document. In the document, entities and edges may be interconnected to form a directed acyclic graph. Accordingly, as user input is received, the document authoring tool may verify that the graph resulting after each user input is processed to modify the graph maintains the acyclic nature of the graph.

Once the document is defined, it may be published so that it may be used by parties interested in applying the knowledge captured in the document. Publishing the document may entail converting the edges defining links between data outputs and data inputs of entities into computer executable code that causes data to flow between computer-executable instructions representing transforms associated with at least a portion of the entities. For entities that represent data sources, publishing the document may entail providing computer-executable instructions that acquire data from the source.

Publishing the document may entail one or more manipulations to improve the efficiency of operation of the document. Some manipulations may relate to ordering the operations to reduce the total amount of computation required to generate a result based on user interaction with the document. Such manipulations may entail reordering entities in the graph, inserting entities or removing entities to reduce the amount of processing required to achieve a result that matches a result achieved with the document before manipulation.

Alternatively or additionally, the manipulations may relate to the manner in which the document is partitioned for distribution in a tiered computer system. The document may be partitioned and different partitions may be formatted for execution on different computing devices. The partitioning may be performed to improve efficiency of operation in the deployed environment. Such partitioning may entail assigning portions of the document to partitions based on criteria such as processing power available on a computing device to execute each partition or based on available network bandwidth between those computing devices.

The foregoing is non-limiting summary of features the invention. It should be appreciated that the forgoing features may be used singly or in any suitable combination.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIGS. 6A and 6B are schematic diagrams illustrating an example of swapping transforms as part of improving efficiency of execution of an interactive document;

FIGS. 7A and 7B are schematic diagrams illustrating an example of inserting a transform as part of improving efficiency of execution of an interactive document;

FIGS. 8A, 8B and 8C are schematic diagrams illustrating an example of tier splitting as part of improving efficiency of execution of an interactive document;

DETAILED DESCRIPTION

The inventors have recognized and appreciated that a novel approach to representing an interactive document as a directed acyclic graph of nodes and edges may facilitate the authoring and distribution of complex documents. Entities of multiple types may be incorporated in the document to provide the capability to capture knowledge about data analysis. Yet, a relatively small feature set needs be supported by a document authoring tool.

In some embodiments, the tool allows a user to define entities that represent external data, visualizations, interactivity of visualizations and analytics, including analytical patterns. The tool supports data schemas of arbitrary complexity, which may be used by any of the entities. Moreover, the tool supports edges interconnecting any types of entities, including those representing data sources, analytics, visualizations, and interactivity. In some embodiments, this relatively limited set of functionality is adequate to represent complex analytical operations and to support complex interactions between a user and the document.

Such a representation leads to efficiencies in distributing the document. The graph may be manipulated to improve the efficiency with which results are generated as a user interacts with the document. Improvements may be achieved, for example, by reordering the entities in the graph, inserting additional entities, removing entities or modifying entities, so long as the overall result is not changed. As an example, if an entity that performs a transformation resulting in condensing a data set is preceded by an entity including a complex transformation applied to the entire data set, substantial computation may be performed on data in the set that does not ultimately affect an output. In this scenario, the preceding entity may be modified so as to apply the transformation to only the portion of the data set output after the subsequent transformation.

Alternatively or additionally, efficiencies may be achieved based on the manner in which the document is partitioned to execute on multiple computing devices when the document is published. For example, the graph may be partitioned such that portions of the functions of the document are performed on a user device while other portions of the functions are performed on one or more servers "in the cloud." The graph may be partitioned such that entities involving user inputs and outputs are assigned to a partition assigned to a user device. Other entities, which may be associated with transformations that require substantial computation, may be assigned to servers to which the user device is networked. The specific server to which a partition is assigned may depend on factors that enhance efficiency, such as availability of a data source providing data that is input to the transformation.

Figure 1:
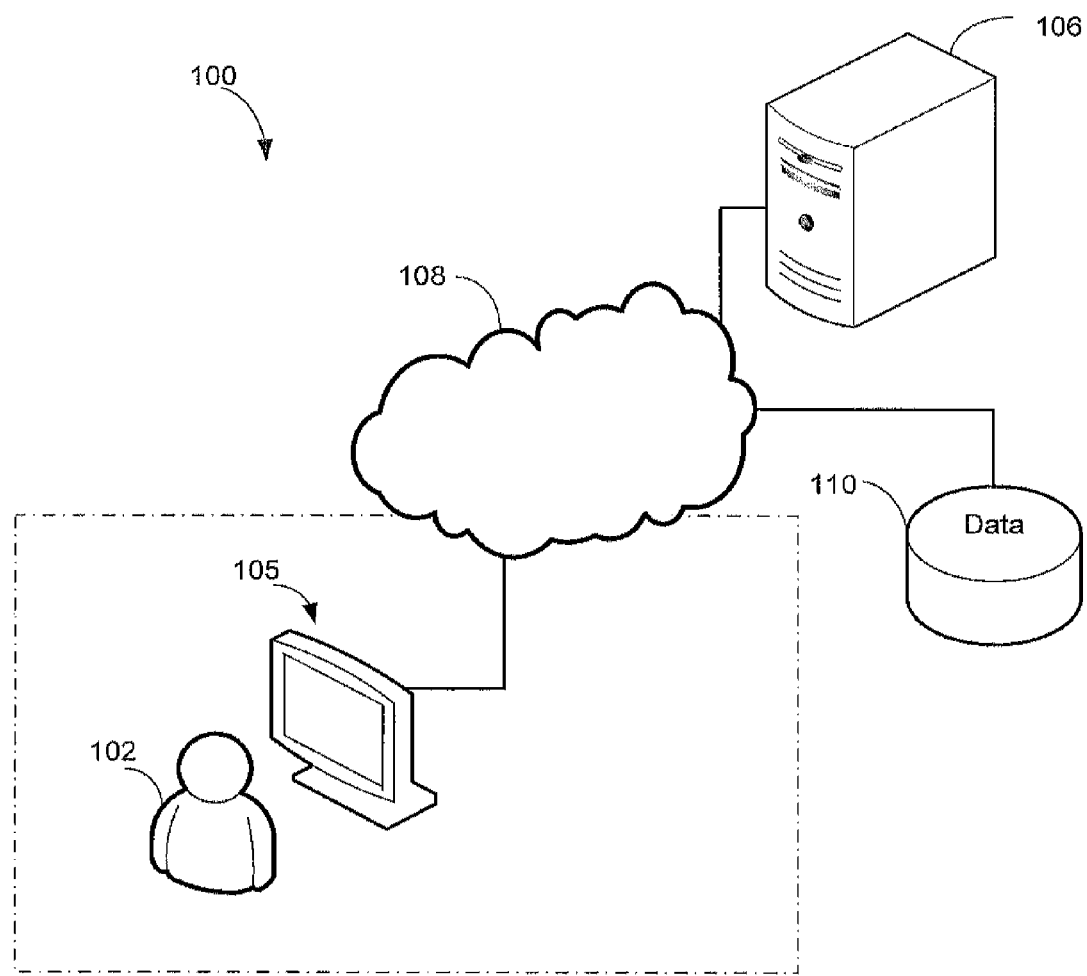
FIG. 1 is a high-level block diagram illustrating a computing environment in which some embodiments may be practiced.

FIG. 1 is a high level diagram illustrating a computing environment 100 in which some embodiments of the invention may be practiced. Computing environment 100 includes a user 102 interacting with a computing device 105. Computing device 105 may be any suitable computing device, such as a desktop computer, a laptop computer, a mobile phone, or a PDA. Computing device 105 may operate under any suitable computing architecture, and include any suitable operating system, such as variants of the WINDOWS® Operating System developed by MICROSOFT® Corporation.

Computing device 105 may have the capability to communicate over any suitable wired or wireless communications medium to a server 106. The communication between computing device 105 and server 106 may be over computer network(s) 108, which may be any suitable number or type of telecommunications networks, such as the Internet, a corporate intranet, or cellular networks. Server 106 may be implemented using any suitable computing architecture, and may be configured with any suitable operating system, such as variants of the WINDOWS® Operating System developed by MICROSOFT® Corporation. Moreover, while server 106 is illustrated in FIG. 1 as being a single computer, it may be any suitable number of computers configured to operate as a coherent system. Computing device 105 may also have access to any suitable source of data 110.

In the embodiment of FIG. 1, a data analysis system may execute on server 106, and computer 105 may provide a user interface through which a user may enter inputs and receive results. In some embodiments, user inputs may specify, via a document authoring tool, entities and their relationships to form an interactive document. It should be appreciated that there is no requirement that the data analysis system execute on a server and it may, for example, execute wholly on computer 105.

In the embodiment illustrated, data 110 may store information representing a document under development by user 102. Accordingly, as a user interacts with the data analysis system, the document authoring tool may store as data 110 a representation of the document.

As this model of an interactive document is built, server 106 may generate information depicting the document in a format suitable for display in a graphical user interface. The information generated by server 106 may be sent over computer network(s) 108 and be displayed on a display of computing device 105. A display may be any suitable display, including an LCD or CRT display, and may be either internal or external to computing device 105.

Figure 2:
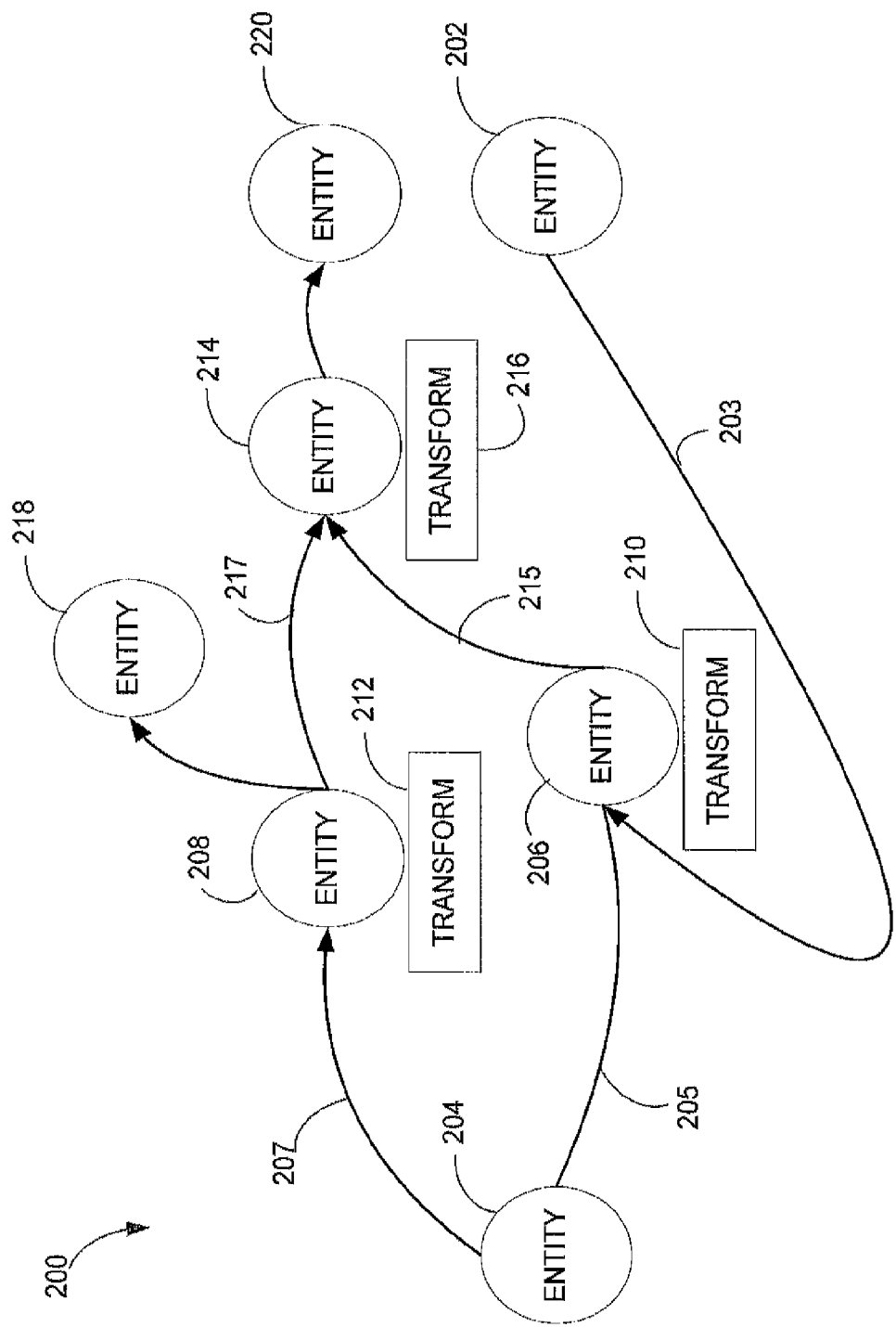
FIG. 2 is a schematic diagram of an interactive document, in accordance with some embodiments.

FIG. 2 is an illustrative diagram of an example of an interactive document 200 in accordance with some embodiments. The interactive document 200 may be built using a document authoring tool and may be composed of multiple entities of different types. For example, the entities may represent a source of external data, a visualization, interactivity of a visualization, or an analytic. Though, it should be appreciated that entities of any type may be incorporated in the interactive document. Some of the entities in the interactive document may include transformations indicating a relationship between input data and output data of the entity.

The entities are interconnected via edges, with an edge connecting two entities and indicating a data flow between these entities. Some entities may have both an input and an output, while others may have no inputs and an output or an input and no output. For example, an analytic may be represented as an entity that includes a transformation between an input and an output. A data source, however, may have no inputs but may provide an output supplying data from the source. For example, when the data source comprises a table, an output may be a collection of rows. If the table is nested, the output rows may themselves be columns that include tables. An entity representing a visualization has an input comprising data to be visually represented and suitable supplemental information and no output. As a result, the document may also represent a binding between data and one or more of an analytic, a visualization and/or interactivity of a visualization. Edges may connect any entities, including entities of different types.

FIG. 2, in addition to providing a logical representation of an interactive document, may also be regarded as representation of a user interface through which a user may specify a document. The user, for example, may provide information through a user interface identifying entities to include in the document. In addition, the user may specify interconnections between the entities. Properties associated with entities and edges may also be specified. These properties, for example, may specify a transform associated with an entity in the form of computer-executable instructions, or other suitable representation of an operation performed by a computer when the document is executed. Likewise, properties may be specified for edges, indicating, for example, conditions under which data is to pass between entities. A property associated with an edge may indicate, for example, that data is "pushed" by an entity outputting data or "pulled" by an entity receiving data as an output.

FIG. 2 illustrates that the interactive document 200 may comprise entities 202 and 204 that represent data sources. The data sources may be tables, nested tables or any other types of data sources. The data sources may also comprise external data sources. As shown in FIG. 2, because these entities represent sources of data, they do not receive data and only output data. Each of these entities is connected via one or more directed edges to another entities within the document. Thus, entity 202 is connected via an edge 203 to an entity 206, and entity 204 is connected via an edge 205 to entity 206 and an edge 207 to an entity 208. The edges 203, 205 and 207 indicate a data flow from the entities representing data sources to other entities represented in the interactive document 200. In some scenarios, the data sources may be updated by receiving data.

Each of entities 206 and 208 may be referred to as an analytic. The analytic entities perform transformation of the data and are therefore shown as associated with respective transforms 210 and 212. These entities may transform data input by applying analytic logic to the data input and generating an output result based on the data input having been operated upon. The transformations define a functional relationship between an input and an output of an entity. The analytics may include rules, equations, constraints, expressions as well as complex data structures, such as nested data, or combinations thereof.

A transform defines operations that may be performed on data received as one or more inputs to generate output(s) provided to other entities. For example, the transform may comprise a calculation on data. Accordingly, the entities that perform operations on the data have both one or more inputs and one or more outputs. The operations may include calculations, transformations, evaluation of equations, or application of constraints or rules and any other suitable operations.

The interactive document 200 is shown to include another entity 214 associated with a transform 216. The entity 214 is connected via an edge 215 with the entity 206 and via an edge 217 with the entity 208. Thus, the entity 214 may receive data from entities 206 and 208 and transform the data in accordance with operations defined in the transform 216.

Some of the entities represented in an interactive document may have an input but no output. Examples of such entities are shown as an entity 218 and an entity 220. These entities may be, for example, visualizations that only accept inputs (e.g., data to be visually represented and supplemental information) but do not generate any data outputs. Accordingly, as shown in FIG. 2, the entities 218 and 220 are connected via directed edges with entities 208 and 214, respectively. The visualizations may be entities representing a graphical object rendered on a graphical user interface.

The interactive document 200 in FIG. 2 illustrates multiple entities represented in the documents and a flow of data between the entities. The entities and edges may be interconnected to form a directed acyclic graph. The entities that have both an input and output may receive data as an input, perform operations on the data and generate output that is provided to one or more other entities.

In some scenarios, entities may be interactive visualizations which are therefore referred to as visualizations with interactivity. Such visualizations may receive user input indicating a change in a way the visualization is to be presented. In response to a suitable input, the appearance of the visualization may change. An interactive slider provides an example of such a visualization. Though, any other suitable visualizations with interactivity may be substituted. Data linked to an interactive visualization may also change in response to a user input. Such a data change may be modeled as an entity with an output.

FIGS. 3A and 3B are illustrations of a visualization 300 with interactivity. FIG. 3C is an illustration of how the visualization of FIGS. 3A and 3B may be represented in an interactive document in the form of FIG. 2. The visualization may be a graphical object rendered on a graphical user interface. To maintain the acyclic nature of the graph formed by entities and edges, the document authoring tool may be configured to represent the visualization with interactivity as two separate entities, the first entity comprising an entity with an input and no output and the second entity comprising an entity with an output and no input. The first entity accepts input indicating a change in an aspect of the visualization. The second entity may have the output indicating a result of user input interacting with the visualization. The emitted data may affect other entities in the graph, including the first entity. However, as noted above, the acyclic nature of the graph is preserved because the first and second entities are separate and disconnected.

In the example of FIGS. 3A and 3B, the visualization 300 comprises an interactive graphical object, such as a bar graph. The bar graph 302 shows, for a data set comprising data on real estate properties, a number of items in the data set that have a certain square footage. The height of each bar indicates the number of properties of a specific square footage.

Because the graph formed by entities and edges in accordance with some embodiments is acyclic, to avoid a cycle in the data flow, the visualization 300 may be represented as two separate entities, 308 and 310 shown in FIG. 3C. The first entity 308 may comprise an input representing data that configures a visual appearance of the graphical object when rendered on the graphical user interface. The second entity 310 may represent user interaction with the graphical object by providing an output representing the results of the user interaction with the interactive graphical object. Visualization 300 is interactive in that a user may, using graphical interface techniques as are known in the art, manipulate a portion of visualization 300 to represent an input. In this example, the input represents a change to the data being depicted through the bar graph. In this specific example, a user may manipulate a human interface device, such as a mouse, to drag a bar and change its height. FIG. 3A illustrates a bar 306, a bar graph 302 prior to user input. As can be seen in FIG. 3A, bar 306 has a first height, corresponding to an initial value in the data set being depicted. FIG. 3B illustrates bar 306 after user input has manipulated the height of the bar. As can be seen, bar 306 has a second, larger height, in FIG. 3B. Accordingly, the user input, depicted in FIGS. 3A and 3B by a user manipulating pointer 304 to change the height of bar 306 may be represented in the model of FIG. 2 by a data source. FIG. 3C illustrates that two entities may be incorporated in an interactive document to represent the interactive visualization 300 of FIGS. 3A and 3B. Entity 308 may represent the portion of interactive visualization 300 that visually represents data. Input edge 307 represents the data that is supplied to entity 308 for display as a bar graph. The specific data that will be displayed may depend on how input edge 307 is connected to other entities in the document.

In contrast, entity 310 represents the portion of interactive visualization 300 that produces output in response to a user input. Output edge 309 represents the data that is output. The manner in which the data output by entity 310 is used in the interactive document depends on how output edge 309 is connected to other entities in the document.

This representation of a visualization with interactivity as two separate entities allows maintaining the acyclic nature of the graph.

Figure 3:
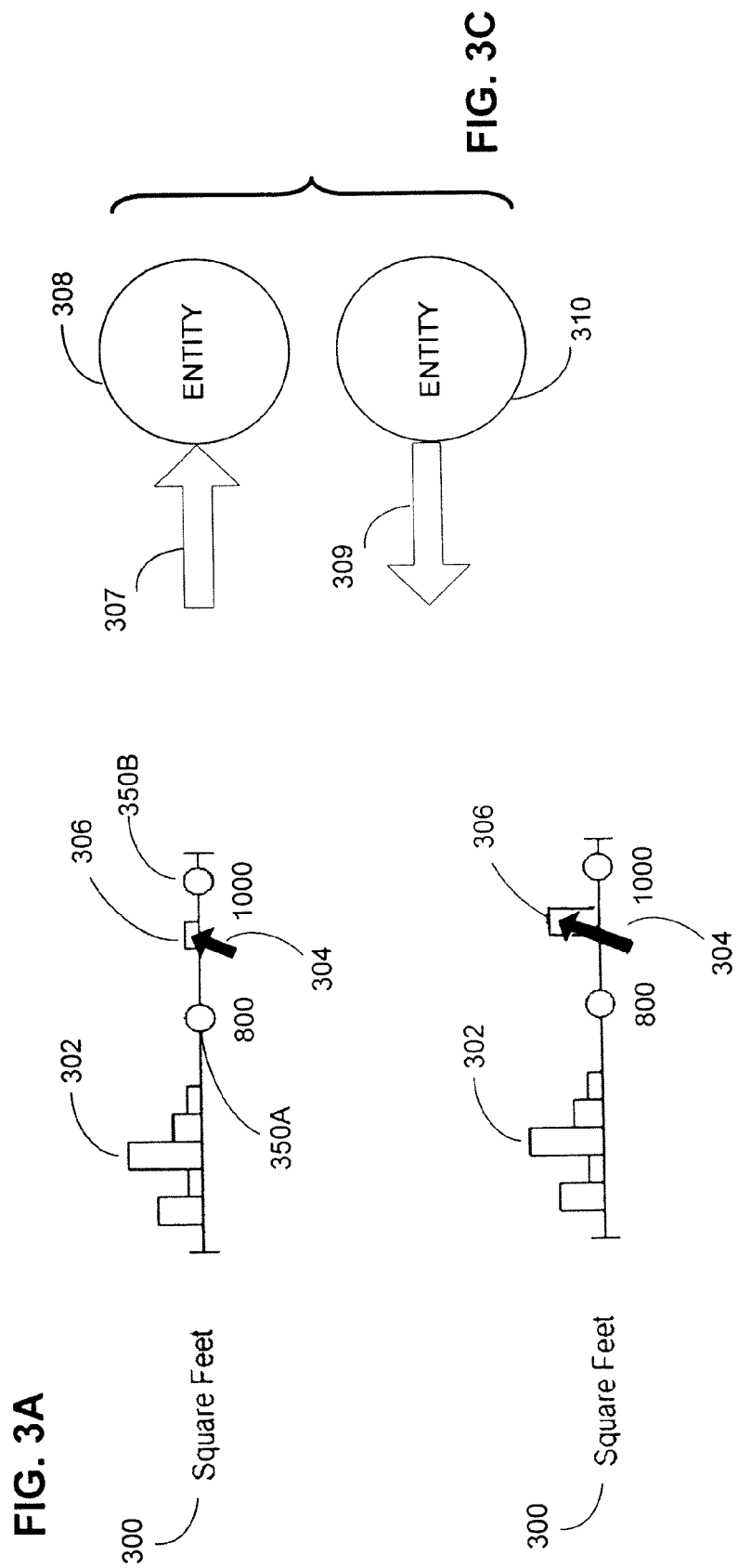
FIGS. 3A, 3B and 3C are schematic diagrams illustrating an interactive visualization, in accordance with some embodiments.

FIG. 3 also provides another example of a manner in which a user may interact with a visualization. In this example, visualization 300 also includes slider controls 350A and 350B. The controls may collectively define a range. For example, FIGS. 3A and 3B show that control 350A is set to 800 square feet and control 350B is set to 1000 square feet. Each of controls 350A and 350B may be, like bar 306, manipulable by user input. Accordingly, user input specifying a different position of control 350A may specify a different lower limit of the range. Likewise, user input specifying a different position of control 350B may specify a different upper limit of the range.

The positions of slider controls 350A and 350B may be used in any suitable way. In this example, the controls 350A and 350B may collectively form a slider that specifies filter criteria on a data set. For example, in this scenario, the positioning of slider controls 350A and 350B may define a range of data values to be filtered from the data set for further processing. Accordingly, the results of user input manipulating slider controls 350A and 350B may also be represented as an output of an entity associated with visualization 300.

In some embodiments, other types of entities may be represented using two separate entities. For example, a data source or data sink, which may, in some embodiments, receive data to be updated, may be similarly represented as two entities. One of such entities may have no output but only an input through which data updates are received, whereas another entity may have an input receiving a query (e.g., a set of query parameters) and an output supplying the results of the query. The output from that entity of the two separate entities representing an updatable data source or data sink may be supplied in the same form as output provided by data sources or sinks that are not updated and may therefore be referred to as invariable.

Regardless of the specific functions represented by each of the entities in a document, each of the entities may be associated with a function performed on data. Ultimately, when the interactive document is published and used, each of the entities may be associated with computer executable instructions that perform those functions. The association between an entity and computer executable instructions may be achieved in any suitable way. In some embodiments, as part of authoring a document, a user may provide input that specifies the computer executable instructions. The user input, for example, may be source code in a high-level programming language such that the computer executable instructions associated with an entity may be entered by a user as the user authors a document. Though, in other embodiments, entities may be predefined such that the computer executable instructions that perform functions of an entity when a document containing that entity is published are predefined. Entities, for example, may be predefined by other users or software vendors, and an authoring tool may present to a user a library of such entities. For example, in visualization 300 (FIGS. 3A and 3B) representing an interactive bar graph may be predefined and selected by a user from a library of such predefined entities accompanying an authoring tool. Accordingly, it should be appreciated that the invention is not limited by the manner in which entities are generated.

Figure 4:
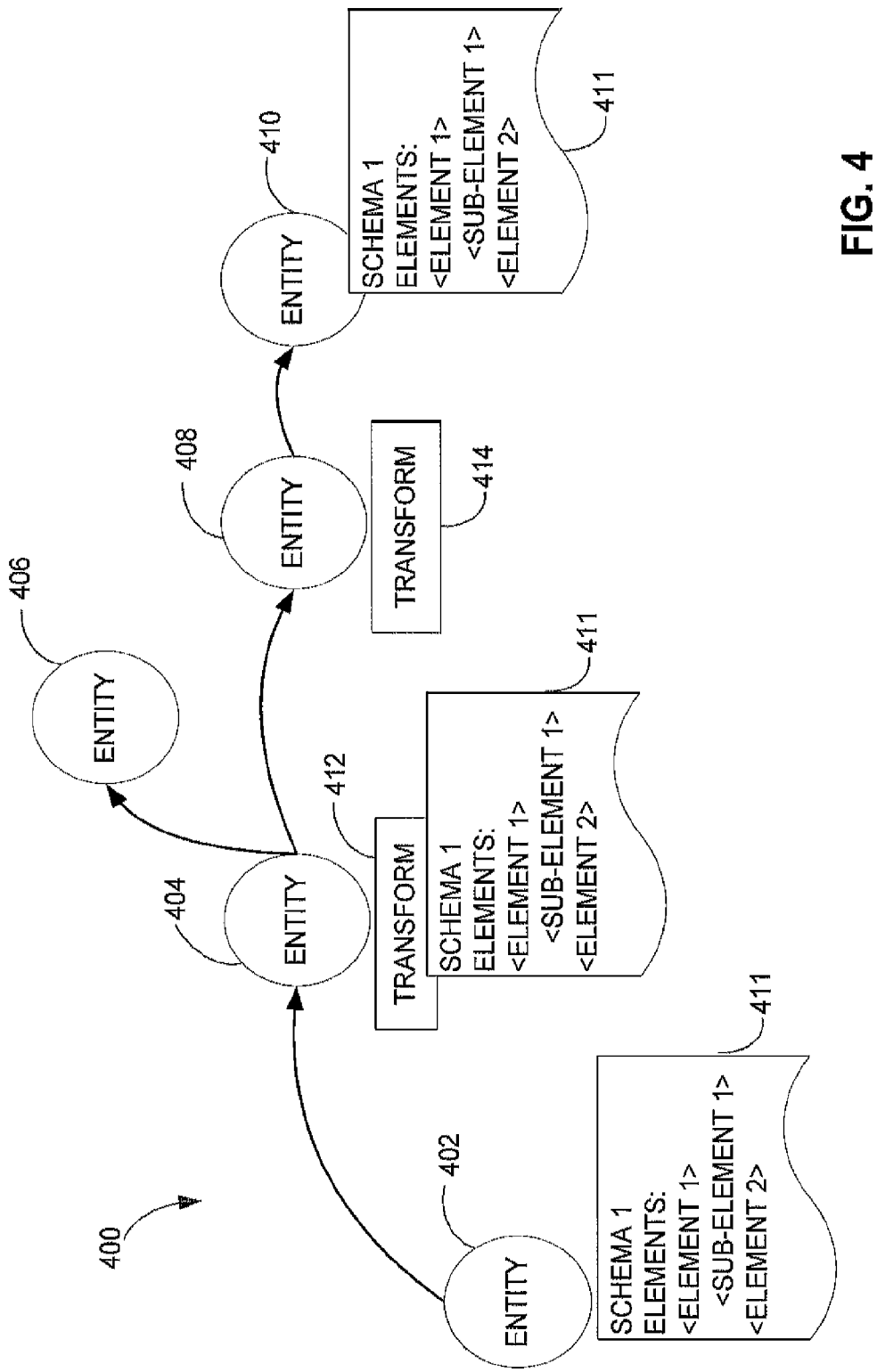
FIG. 4 is a schematic diagram illustrating the use of a common data schema to define entities in an interactive document

Though, FIG. 4 illustrates a feature that may be incorporated in an authoring tool according to some embodiments of the invention. FIG. 4 illustrates that one or more data schema may be specified for a document. The data schema may be used throughout the document, including in entities of different types and to specify the format of data that is to be transmitted between entities.

In some embodiments, a common framework is provided to represent disparate entities of different types. The common framework allows using a common data schema across multiple types of entities. FIG. 4 illustrates an interactive document 400 comprising entities 402, 404, 406, 408 and 410 where some of the entities are shown to be defined using a common schema 411. In this example, the entity 402 is an external data source and entities 404 and 408, each associated with a respective transform 412 and 414, are analytics. Also, the entities 406 and 410 are visualizations. The entity 402 representing an external data source, the entity 404 representing an analytic and the entity 410 representing a visualization are shown to be associated with the data schema 411 to illustrate that a common underlying data schema may be used to define entities of different types. Data schemas of any suitable complexity may be employed.

An authoring tool may enable the user to define entities of any type in an interactive document in a simplified and intuitive manner, using a standardized form provided by the data schema. Different elements, sub-elements, suitable functions and other types of information defining an entity may be created using the data schema.

By combining entities of different types, a user may represent both simple documents of the type that can be generated using current data processing software applications. For example, a conventional spreadsheet containing rows and columns of cells, each potentially containing a value, may be represented in a document in the form of FIG. 2 using entities configured as data sources to represent values in the cells. Equations that may be programmed into cells in an EXCEL spreadsheet may be represented as a transform associated with an entity receiving as an input, an edge coupled to the entity representing the data source. Other entities may represent other features that may be included in an EXCEL document. For example, the charting capability associated with an EXCEL spreadsheet may be represented using a further entity that receives as an input data to be displayed.

In addition, a document in the format specified in FIG. 2 may be readily created by a user to implement functions that are more complex and involve interactions of entities of types that are not readily represented in a conventional spreadsheet program.

Similarly, a conventional word processing document may be represented in the format illustrated in FIG. 2. For example, text input into the document may be represented as an entity formatted as a data source. Word processing operations, such as sorting or merging data from multiple sources, for example, may be represented by one or more entities having associated transforms.

As with the case of a spreadsheet document, representing a document in the form of FIG. 2 allows a user to more easily specify complex functions. For example, a user may combine in a single document functions traditionally performed with a spreadsheet and those traditionally performed by a word processor by linking entities of different types, including those that perform functions traditionally associated with a spreadsheet document and those traditionally performed by a word processing document. Moreover, the representation of a document shown in FIG. 2 allows a user to incorporate functions for data analysis that are not traditionally supported by spreadsheet or word processing programs.

Further, representing a document as an interconnected graph of entities facilitates use of the document in environments that expand beyond a traditional computing environment in which spreadsheet programs and word processing programs were initially developed. As one example, a document created as depicted in FIG. 2 may be readily transformed for publication in distributed computing environments, such as expected to more frequently occur as analytical functions are performed "in the cloud."

Accordingly, an interactive document may be published so that a user may utilize the document. The publishing may involve converting, with a computerized tool, a graph formed by entities represented in the interactive document into executable components configured for execution on a computing device. That conversion may be performed using techniques as are known in the art for compiling or interpreting computer executable instructions in a higher level programming language. For example, computer executable instructions associated with the entities may be combined into an executable version of a program based on the manner in which those entities are specified as connected through edges in the document. As part of the conversion process, the computerized tool may insert further computer executable instructions that control the ordering of the execution of the computer executable instructions associated with each of the entities and the flow of data between those entities. For example, computer programming techniques that result in data being queried from a data source may be incorporated in the executable document. Additionally, as part of publication, references to specific computing devices that may interact to execute the document may also be partially or fully resolved. For example, in scenarios in which an entity depicting a data source represents data that may be obtained by querying a server, publishing the document may include inserting information such that upon execution of the document an appropriate query will be sent to the appropriate server. Programming languages that support such functions are known in the art, such that known techniques for configuring computer executable instructions for execution in a specific hardware environment may be used as part of the publication process. Accordingly, it should be appreciated that the specific techniques used in publishing the document are not critical to the invention.

In some embodiments, the graph may be modified to improve execution as it is published. Such modifications may be based on criteria indicative of efficient execution. Such criteria may include time required to complete an operation, amount of network bandwidth consumed, or interference with other operations, for example. The graph may be partitioned into two or more partitions. The partitioning may be based on a processing power available on a user device, memory capacity and availability and capability of other computing devices (e.g., a graphics processing unit, etc.).

In some embodiments, the interactive document, in the form of the executable components, may be deployed on a suitable deployment environment. The deployment environment may be indicated in any suitable manner. For example, a user input may be received identifying the deployment environment. Though, other ways of identifying the deployment environment may be substituted.

A deployment environment may comprise multiple computing devices that have different properties making the devices suitable for different purposes. For example, some of the devices, such as servers, may be capable of performing multiple computationally intensive operations. Such devices may handle a large volume of processing operations. Other devices in the deployment environment may be more suited for handling multiple data access operations. These devices may be associated with one or more databases that may be accessed frequently. The deployment environment may comprise any other devices.

A published interactive document may be presented to a user on a user interface of a user device. The user interface may allow the user to view and interact with the document. In some embodiments, such user device may have a limited processing power that does not allow the device to perform multiple computationally intensive operations or multiple data access operations. The device may also have a limited data storage capacity. However, one or more entities represented in the interactive document may perform multiple computationally intensive operations. For example, an entity may be a transformation that requires substantial computation. Other entities may, such as those associated with data sources, may require or multiple data access operations. In this scenario, efficient execution may be achieved by implementing portions of the document that directly control interaction with the user on the user device. To achieve more efficient execution, other portions of the document, such as those involving extensive computation or data manipulation may be performed on other computing devices to which the user device is linked in the computing environment.

Accordingly, execution of one or more entities in the interactive document converted into respective executable components may be partitioned among different computing devices in the deployment environment, depending on suitability and availability of the devices to execute the components. The graph may be partitioned into a plurality of partitions based on properties of computing devices in the deployment environment. The document authoring tool may partition the graph automatically, without user intervention. Alternatively or additionally, in some embodiments, the graph may be partitioned based on suitable user input.

Different partitions may be assigned to execute on different devices, based on computing capabilities of the devices. The graph representing the document may be partitioned such that portions of the functions of the document are performed on the user device while other portions of the functions are performed on one or more servers "in the cloud." Thus, a partition may be defined for execution on the user device, based on computing capabilities of the user device. Also, one or more partitions for execution on a network server may be defined, which may be implemented based on bandwidth of a network connection between the network server and a data source. The partitioning of the document to execute on multiple computing devices when the interactive document is published may improve efficiency of the execution of the document.

Figure 5:
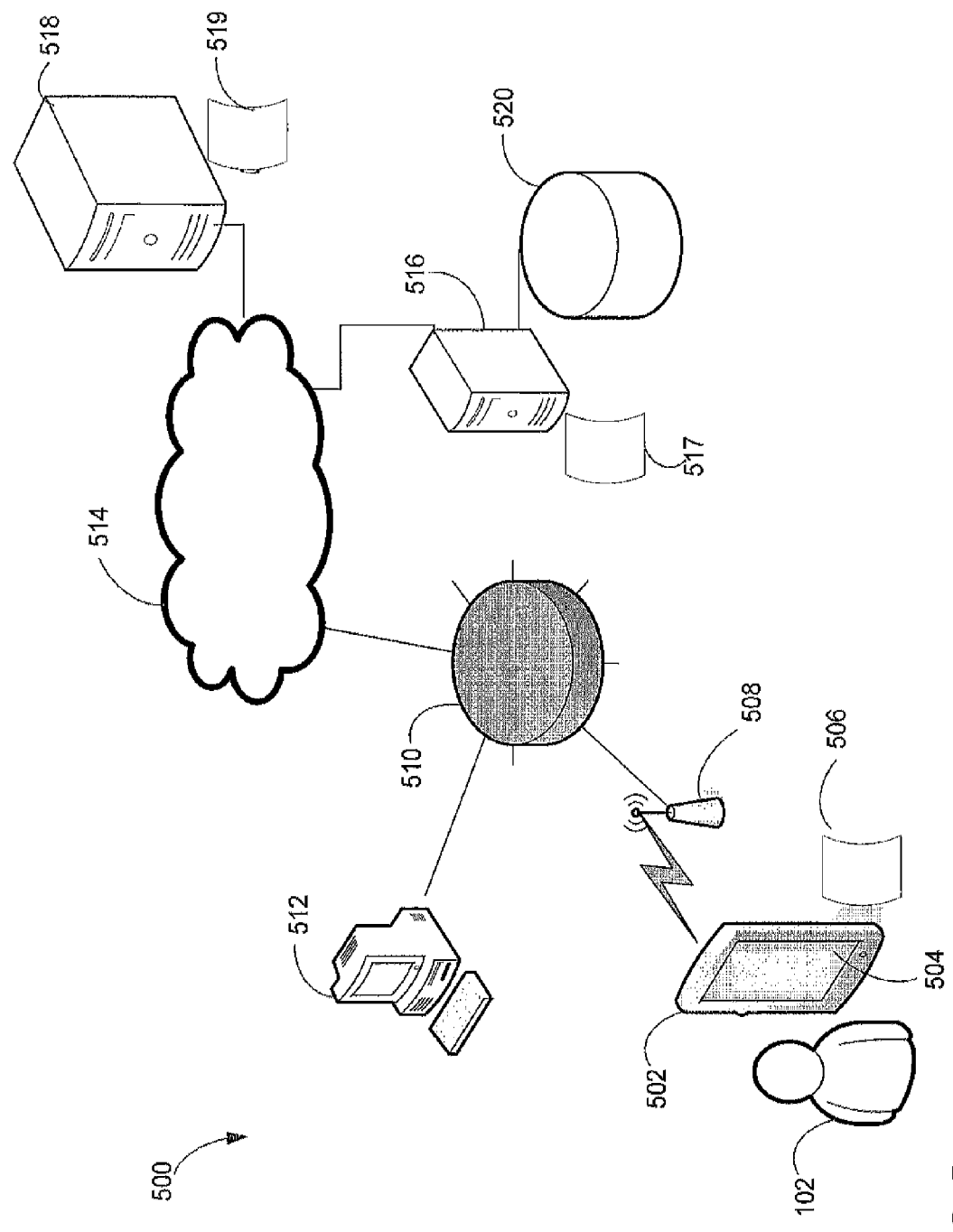
FIG. 5 is a schematic diagram illustrating partitioning of execution of portions of an interactive document between multiple devices, in accordance with some embodiments.

FIG. 5 illustrates an example of a deployment environment 500 where an interactive document is partitioned to execute on multiple computing devices. In this example, user 102 may interact with the published interactive document via a user device 502. The user device 502 may be any suitable computing device. For example, the user device 502 may be a mobile computing device.

The device 502 may provide a user interface 504 through which the user 102 may view and interact with the interactive document. The graph may be partitioned into multiple partitions to execute on different devices in the deployment environment 500.

In the example illustrated, a portion 506 of the document comprising entities involving user inputs and outputs may be assigned to a partition assigned to the user device 502. That partition may be assigned to the user device 502 based on computing capabilities of the user device 502 or other properties of the user device.

The device 502 may communicate wirelessly or otherwise with multiple devices in a deployment environment. For example, the device 502 may communicate, via an access point 508, with a router 510. The router 510 may connect the device 502 to one or more other computing devices "in the cloud." For example, the router 510 may allow the device 502 to communicate, via a network 514, with servers 516 and 518. The network may be any suitable network. However, this connection may be a relatively low bandwidth connection such that portion 506 is generated from a portion of a graph representing an interactive document that is selected to exclude any entities that access external sources of data.

Different partitions of the document may be assigned to different computing devices "in the cloud," based on computing capabilities of the devices. In FIG. 5, a portion 517 of the interactive document comprising one or more entities that require multiple and frequent data access operations may be assigned to the server 516 that provides such capability. The server 516 may be associated with a data source 520 that stores the data that is frequently accessed.

In some embodiments, the server 516 may provide functionality of an external service. In some embodiments, one or more of such entities may be identified that have transforms executable by an external service. When a graph is converted into the executable components, one or more of the components may execute instructions placing a call on the external service.

A portion 519 of the interactive document comprising one or more entities (e.g., transformations) that require substantial computation may be assigned to the server 518 that has processing power sufficient for execution of multiple computationally intensive operations. The executable components deployed to the multiple computing devices may therefore operate "in the cloud" where they can exchange data in accordance with the data flow defined in the graph. It should be appreciated that each of the servers 516 and 518 may encompass multiple computing devices as embodiments of the inventions are not limited to a particular architecture of the deployment environment.

A specific server to which a partition is assigned may depend on factors that enhance efficiency, such as availability of a data source providing data that is input to the transformation. Also, a partitioning decision may depend on a proximity of one or more computing devices to which partition(s) are assigned to the user device. Any other suitable factors may be taken into consideration. Moreover, the partitioning of the document may be changed at any suitable time based on changing network conditions.

FIG. 5 illustrates an example of partitioning a graph formed by entities represented in an interactive document based on criteria indicative of efficiency of execution. In some embodiments, the graph may be modified before it is partitioned such that partitions leading to efficient execution of the document may more readily be created. For example, if entities that perform transforms that are linear, such that the order in which the transforms are applied does not impact the ultimate result, those entities may be reordered such that entities performing similar types of operations may appear together in the graph. Additionally or alternatively, in some embodiments, an initial graph may be modified based on criteria related to operation of the interactive document that are unrelated to partitioning. For example, in some embodiments, the graph may be modified by reordering one or more entities in the graph, removing one or more entity from the graph, inserting an entity in the graph, merging at least two entities in the graph, etc. These modifications may result in an improvement of efficiency of operation of interactive document.

In some embodiments, reordering entities in the graph comprises reordering an entity having a transform that implements a filter to precede an entity having a transform that implements a computation. The reordering may be based on computational complexity of the filter and the computation.

FIGS. 6A and 6B illustrate an example of such a reordering. As shown in FIG. 6A, a graph 600 may comprise entities 602, 604, 606 and 608. The entity 602 may be, for example, a data source, or other entity that has an output but no inputs. The entity 608 may be a visualization or other entity that has an input but no outputs (e.g., a data sink).

As shown in FIG. 6A, the entity 604 is associated with a transform 605 which may perform a sort operation. The entity 606 is associated with a transform 607 which may perform a filter operation. Data provided by the entity 602 is received by entity 604 which applies the sort transform 605 to the data. Data sorted in accordance with the sort transform 605 is then filtered using the filter transform 607 of entity 606. The result of the sorting and filtering operations may be displayed by entity 608.

Because sort and filter operations are commutative operations, switching their order produces the same output with a different complexity. Accordingly, depending on complexity of sort and filter operations represented by transforms 605 and 607, respectively, the entities in the graph 600 may be reordered by switching the order of the entities 604 and 606. The resulting graph 601 is shown in FIG. 6B where the data output by entity 602 first undergoes a filtering operation using the filter transform 607 of entity 606, a result of which is sorted using the sort transform 605 of entity 604.

As an example, the entity 602 may represent a data source including a listing of real estate properties each associated with a particular zip code. The listing may comprise, for example, n rows. In accordance with the graph 600, the sort transform 605 may be first applied to the zip codes, a result of which may be n rows sorted by the zip codes. The filter transform 607 may then be applied to filter out all zip codes outside of a certain mile range. The result of this operation provided as an output of the entity 606 may be data comprising m rows, where m≤n.

For example, if the data output by the entity 602 comprises n rows where N=10,000,000, the sort transform 605 may order the n rows in the worst case with a complexity of O(n*log(N)) (70,000,000). The filter transform 607 then removes some of the n rows with a O(n) complexity. Because the sort operation has been first applied to the data, the filter operation can be performed with an O(log(n)) complexity, in which case a sequential read to extract the relevant rows takes O(m) time. The overall complexity of the graph 600 will be O(n*log(n))*(complexity of the sort operation)+O(log(n))* (complexity of the filter operation)+O(m).

Because sort and filter operations are commutative operations, switching their order produces the same output with a different complexity. Thus, in the graph 601 shown in FIG. 6B, the filter transform 607 may remove some of the n rows of the data in an O(n) time. The sort transform 605 may then perform a sort operation on the remaining m rows with an O(m*log(m)) complexity. Accordingly, a total complexity of the graph 601 will be O(n)*(complexity of the filter operation)+O(m*log(m))*(complexity of the sort operation), which may be less than the complexity of graph 600.

Based on the complexity of the filter operation represented by the filter transform 607 and the complexity of the sort operation represented by the sort transform 605, an order of the entities 604 and 606 as shown in FIG. 6A or the one shown in FIG. 6B may be preferred. Accordingly, the considerations of efficiency may be used to modify an order of certain transforms within a graph.

In some embodiments, modifying a graph corresponding to an interactive document may involve inserting an entity in the graph. FIGS. 7A and 7B illustrate an example of a graph where an entity comprising a transformation may be inserted in the graph. In this example, an entity may be inserted to perform an additional operation on data that results in the overall improvement of efficiency of the graph.

As shown in FIG. 7A, an entity 702 (e.g., a data source) may output data. The data may comprise by way of example only a listing of real estate properties. The data may be organized as a table, where each of n real estate properties may have m columns (e.g., a latitude, a longitude, an address, a zip code, a number of baths, a number of bedrooms, price, etc.). The data may be provided to an entity 704 which may perform an operation on the data involving a calculation of data to be added as a new column to the existing m columns. For example, the new column may be a luxury index calculated for each property based on a number of baths and a number of bedrooms in the property.

When the new column is calculated, all of the columns of the data and the new columns may be presented on a user interface. The entity 706 may be a visualization that visually displays the data. As an example, the data may be represented on a map showing all properties and their luxury indexes. However, only a limited number of columns may be used to show the real estate properties and their respective luxury indexes. For example, only a latitude, longitude and a luxury index of a real estate property may be used to display this property and its luxury index on the map. Accordingly, one or more of the columns from the data provided by the data source entity 702 may be dropped, leaving only the columns that are required to calculate the column showing the luxury index and the columns used to display the properties on the map. As shown in FIG. 7B, the resulting graph 701 may comprise an additional entity 708 that is associated with a transform 710 applied to drop columns from the data output by the data source entity 702. In particular, the entity 708 drops all of the columns of the data except for a latitude and a longitude of the property and a number of baths and a number of bedrooms at the property. The insertion of the entity 708 results in reduction of an amount of data that flows in the graph. Accordingly, the efficiency of operation of the interactive document may be improved.

In some embodiments, modifications of a graph may comprise partitioning the graph for distribution in a tiered computer system. The tier splitting may involve partitioning the graph into portions to be executed on different devices, such as different servers, or a user device, etc. The partitioning may be performed based on a number of suitable factors. For example, computing capabilities of the devices to which partitions are assigned may be utilized.

In some embodiments, a computerized tool for converting the graph into one or more executable components, such as, for example, a document authoring tool, prior to the converting the graph into the executable components, may manipulate the graph for efficiency purposes. Each of the executable components may be configured to execute on a device from the multiple devices in the deployment environment, with some of the components configured to execute on the user device, which may be a mobile computing device. The deployment environment may comprise multiple different computing devices. For example, the deployment environment may comprise may comprise a user device through which the user interacts with the graph and one or more other devices capable of executing the executable components.

The graph may be manipulated to improve a value of at least one metric indicative of user interaction with the interactive document in the deployment environment. The metric may comprise bandwidth in a communication link to a user device mobile computing device used during interaction with the interactive document by the user of the mobile computing device. The metric may also comprise processing power consumed on the mobile computing device during interaction with the interactive document by the user of the mobile computing device.

Figure 8C:
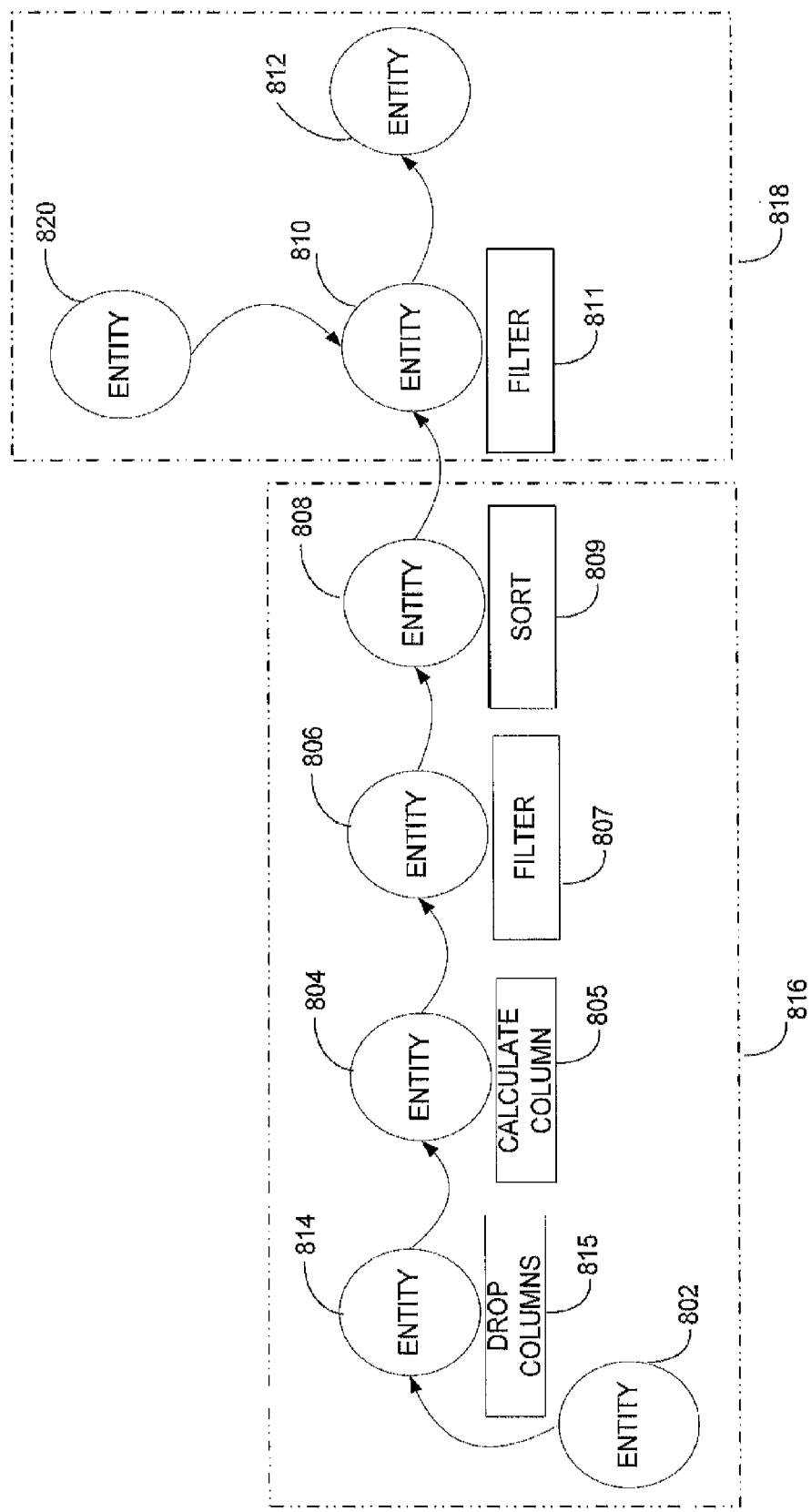

FIGS. 8A, 8B and 8C illustrate an example of the tier-based partitioning based on improvement of a value of at least one metric indicative of user interaction with the interactive document in the deployment environment. As shown in FIG. 8A, a graph 800 of an interactive document may comprise entities 802, 804, 806, 808, 810 and 812. The entity 802 may be a data source that outputs data to be processed by the entities 804, 806, 808, 810 each of which is associated with a respective transform 805, 807, 809 and 811. As in the examples above, the data may comprise a listing of real estate properties. The listing may include a large number of properties, such as, by way of example only, 10,000,000 properties. The user may interact with the graph through a user interface of a user device which may be a mobile computing device.

As shown in FIG. 8A, the entity 804 may apply the "calculate column" transform 805 to calculate, for each property in the data, a luxury index, based on a number on bathrooms and a number of bedrooms at the property. Accordingly, a new column will be calculated.

Next, in accordance with the data flow indicated in the graph 800, the entity 806 may apply the filter transform 807 to filer out properties that are not in a list including certain zip codes. The resulting data may be sorted using the sort transform 809 of the entity 808. The sort transform 809 may sort the data based on the luxury index column calculated by the entity 804. Finally, another filter transform, transform 811 of the entity 810, may be applied to the sorted data to keep a certain number of the rows in the data (e.g., the top five rows) and filter out the rest. These top rows therefore comprise real estate properties with the highest luxury indexes. The data that is output from the entity 810 comprising real estate properties at certain location(s) that have highest luxury indexes may be input to the entity 812. The entity 812 may be a visualization that displays a certain number (as determined by the filter transform 811) the real estate properties with the highest luxury indexes on a map.

The graph 800 shown in FIG. 8A may be modified based on criteria indicative of efficiency of execution. The modification may include partitioning the graph to execute on different computing devices to achieve improvement in the user's interaction with the document.

A computerized tool may identify an entity in the graph that has a transform that receives as input static values. When such entity is identified, it may be replaced with an entity representing pre-computed static values. Alternatively, the entity that pre-computes the static values may be added to the graph. In the example illustrated in FIG. 8A, such an entity is the entity 804 which applies the transform 805 to the data output by the entity 802 to calculate the luxury column. Values needed to compute the luxury column and display the results are defined during an authoring time when the interactive document is created and are not changed at run time when the document is executed. Accordingly, the luxury column may be pre-computed.

Similarly to the insertion of a new entity to a graph shown in FIGS. 7A and 7B, here, a new entity 814 having a drop column transform 815 may be inserted into the graph 800, as shown in FIG. 8B. The drop column transform 815 may drop all of the columns from the data received by the entity 814 from the entity 802 except for a latitude and a longitude of the property and a number of baths and a number of bedrooms at the property. As another way to improve the efficiency of the graph, an order of the entities 804 and 806 may be reversed, which is not shown for the sake of simplicity.

When the document is published, the graph is converted into executable components each configured to be executed on a computing device. The graph may be partitioned by defining two or more partitions assigned to execute on different devices. The partitioning may be based on computing capabilities of a user device and other devices.

As indicated above, the data output by the entity 802 may comprise a large number of real estate properties. For example, 10,000,000 properties may be listed. Accordingly, computation of the luxury index and further processing of the data may require substantial processing power. As shown in FIG. 8B, executable components corresponding to the entities 802, 814, 804, 806, 808 and 810 may be assigned to a partition 816 assigned to execute on one or more servers which may be networked servers (e.g., the server 518 in FIG. 5). Thus, the processing of the large volume of data may be assigned to the servers having the required capability.

The results of the processing may be presented to the user using the entity 812 which may be assigned to a different partition 818 that is assigned to execute on the user device. The partition 818 may be assigned to the user device based on improving a value of one or more suitable metrics indicative of user interaction with the interactive document. Such metrics may include bandwidth in a communication link to the user device used during interaction with the interactive document by the user of the device, processing power consumed on the user device during interaction with the interactive document by the user and any other suitable metrics. The tier splitting as shown in FIG. 8B may improve user experiences while interacting with the document. Moreover, the tier splitting may lead to efficient utilization of computational resources of the server(s) while saving resource of the user device.

In some embodiments, one or more entities may be assigned to a partitions assigned to execute on the user device. For example, it may be efficient to execute entities that receive user input or that are close in the graph to the entities that receive user input. Such entities may be a visualization, control, interactivity of a visualization, etc.

FIG. 8C illustrates an example of a further modification of the graph shown in FIGS. 8A and 8B by addition of an entity to the graph. As described above, the filter transform 810 may define how many real estate properties sorted based on the luxury index of the properties to display on the map. This number of the properties to be shown on the map may be selected based on suitable user input. Accordingly, in this example, an entity 820 comprising a suitable graphical object may be an interactive object presented on a graphical user interface. As such, the entity 820 may receive user input specifying a number of real estate properties to show on the map. As an example, the entity may represent a slider control as shown in FIGS. 3A and 3B that defines a range of values in a data set. The entity may be added to the graph based on user input or in other suitable manner. For example, the document authoring tool may automatically add such entity to the graph based on analysis of the graph.

In FIG. 8C, the entity 820 may receive user input representing a filter criteria indicating a number of properties to be shown on the map. In response to the received user input indicating the number of properties, the filter transform 810 may select this number of properties and filter out the rest of the properties. The selected properties may then be displayed on the map using the entity 812 representing a visualization. The user may interact with the entity 820 by changing the number of properties desired to be displayed on the map.

To ensure the responsiveness of execution of the entity 810, it may now be more efficient to execute this entity on the user device. Because the entity 820 receives user input, it is efficient to assign this entity to execute on the user device as well. Accordingly, as shown in FIG. 8C, the partition 818 comprises the entities 810, 820 and 812.

It should be appreciated that any other suitable modifications of the graph may be performed as well. For example, an entity suitable for receiving user input indicating different formulas to perform a calculation column using the transform 805 may be added. In this case, this additional entity, along with the entity 805, may be added to the partition 818 configured for execution on the user device.

Figure 9:
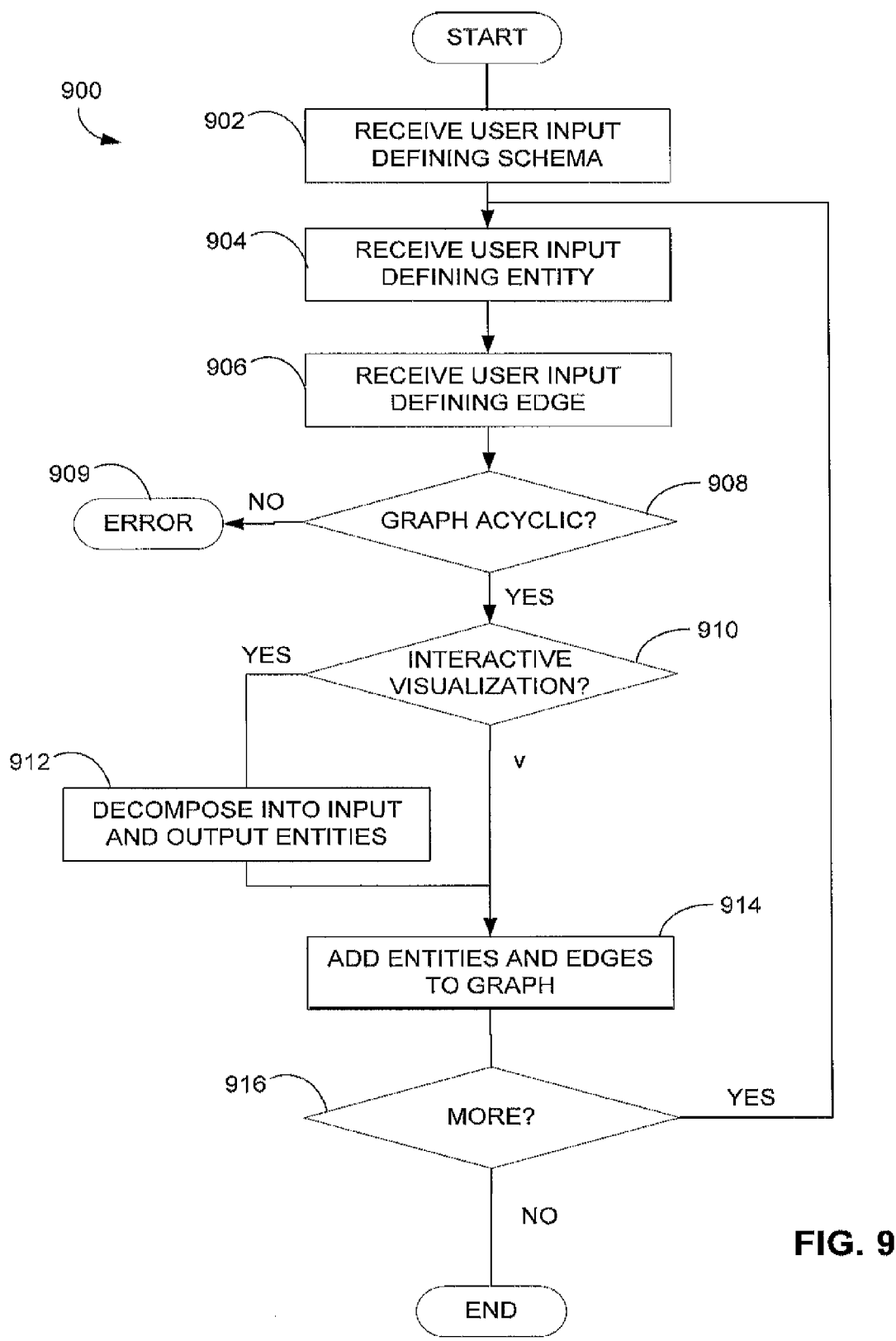
FIG. 9 is a flowchart illustrating a process of operating a document authoring tool, in accordance with some embodiments.

FIG. 9 illustrates an example of a process 900 of operating an authoring tool to create an interactive document, in accordance with some embodiments. Process 900 may start at any suitable time. For example, user input may be received initiating the operation of the tool. At block 902, the tool may receive user input defining a data schema used to define, in a standardized form, entities represented in the interactive document. The schema may be applied to data in multiple entities.

Next, at block 904, user input defining an entity represented in the interactive document may be received. The entity may be defined, for example, by assigning values to elements of the schema. The user may operate a user device having a user interface that receives user input indicative of defining an entity. Any suitable entity of any type may be defined, non-limiting examples of which include a source of external data, a visualization, interactivity of a visualization, an analytic, or a binding between data and at least one of an analytic, a visualization and/or interactivity of a visualization. The entity may also comprise a table or a nested table.

In an interactive document, an entity is connected to at least one other entity via a directed edge indicating a data flow between these entities. Accordingly, at block 906, the tool may receive user input defining one or more edges connecting the entity defined at block 904 and other entities in the graph. If the entity defined at block 904 is the first entity to be defined in the interactive document, at least one other entity may need to be defined before an edge may be defined that connects these entities in the graph.

In embodiments described herein, the graph is a directed acyclic graph. Accordingly, as user input defining an entity and an edge connecting the entity to another entity is received, the document authoring tool may verify that the edges interconnect the entities in an acyclic graph. Thus, process 900 may branch at decision block 908, depending on whether the document authoring tool verifies that, as a result of the user input received at block 906, the acyclic nature of the graph is maintained.

If it is determined at block 908 that the acyclic nature of the graph is violated (i.e., a cycle is the graph is created), the process 900 may branch to block 909, where a respective error is reported in a suitable manner. For example, a message in a visual, audio or other form may be provided to the user to inform the user that the acyclic nature of the graph is violated. It should be appreciated that even though process 900 is shown to end at block 909, the process may be iterative. Accordingly, user input may be received indicating removal of the entity and/or an edge which, if inserted into the graph, would violate the graph's acyclic nature. The process 900 may then return to block 906 where user input defining another entity may be received.

When it is determined at block 908 that the acyclic nature of the graph is maintained, the process 900 may branch to block 910 where it may be determined whether the entity defined at block 904 is an interactive visualization. If this is the case, the entity may be decomposed at block 912 into two entities—one having only an input and no outputs and another having only an output and no inputs. An example of such decomposition of an entity is shown in connection with FIGS. 3A, 3B and 3C. Process 900 may then follow to block 914.

Alternatively, when it is determined at block 910 that the entity defined at block 904 is not an interactive visualization, process 900 may also continue to block 914. At block 914, one or more entities and edges defined at blocks 904, 908 and, in some cases, decomposed into input and output entities at block 912, may be added to the graph.

Next, at decision block 916, it may be determined whether more entities are to be represented in the interactive document. This may be determined in any suitable way. For example, the document authoring tool may prompt the user, via the user interface, to specify whether one or more additional entities are to be defined in the graph. Other ways of determining whether more entities are to be defined may be substituted.

When it is determined, at decision block 916, that no other entities are to be defined, process 900 may end. However, when it is determined, at decision block 916, that other entities will be defined, the process may return to block 904 where user input may be received defining such one or more entities, as shown in FIG. 9. As a result of user input defining different entities and edges connecting the entities on the graph, an interactive document may be created. The interactive document may allow the user to perform operations on different types of entities, some of which may be located and/or executed remotely.

In some embodiments, the graph built as described above, may be modified to improve efficiency of execution of the graph. Additionally or alternatively, the graph may be modified to improve efficiency of operation of the interactive document. In the latter scenarios, the graph may be modified based on operations performed by transforms in the graph and their computational complexity, a volume of data that flows between entities in the graph or a frequency of refreshing the data (e.g., updated once a day or every minute). Further, a level of interactivity of the document may be taken into consideration. If an entity has a transform that receives as input static values that do not change at a time of execution of the interactive document, such entity may be replaced with or supplemented with another entity that pre-computes the static values.

Figure 10:
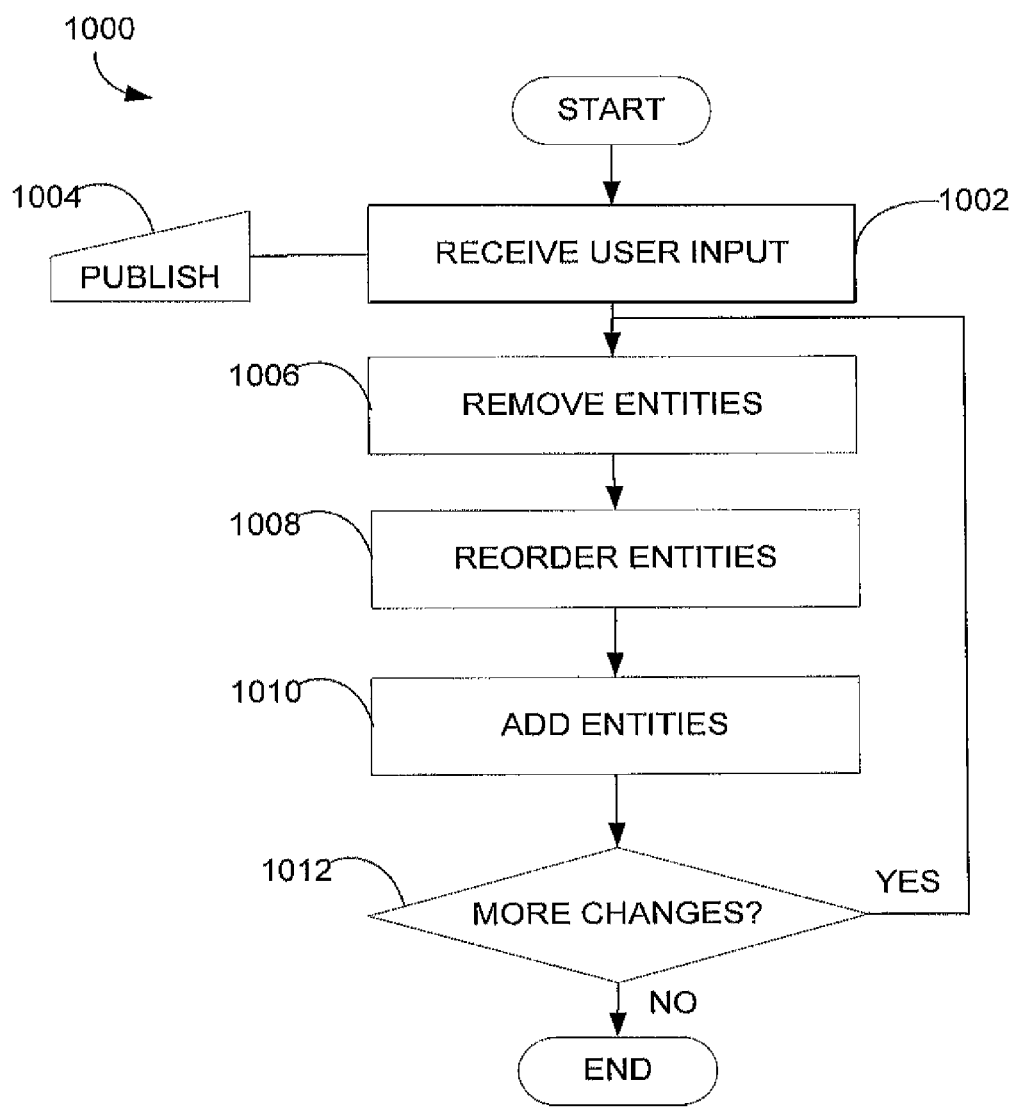
FIG. 10 is a flowchart illustrating a process of operating a document authoring tool and modifying a graph based on criteria related to operation of the interactive document, in accordance with some embodiments.

FIG. 10 is a flowchart illustrating a process 1000 of modifying the graph representing an interactive document based on criteria related to operation of the interactive document. Process 1000 may start when a user input or an indication in a different form is received to initiate the document authoring tool. At block 1002, user input defining the graph may be received by the authoring tool. Accordingly, the process 1000 may encompass the process 900 shown in FIG. 9. The graph created as described in connection with FIG. 9 may be published, at block 1004. Publishing the graph may include generating executable components configured to execute on one or more computing devices.

Next, the graph may be modified to achieve greater efficiency of operation of the interactive document, as measured by improvement in any one or more metrics. Any suitable modifications to the graph may be effected in any suitable order. In the example illustrated, at block 1006, the document authoring tool may remove one or more entities from the graph. The removal of the entities may involve merging at least two entities. At block 1008, two or more entities in the graph may be reordered. An example of reordering of the entities is shown in FIGS. 6A and 6B. At block 1010, one or more entities may be added, which is illustrated by way of example in FIGS. 7A and 7B. It should be appreciated that processing at blocks 1006-1010 may execute at any suitable order as embodiments are not limited to any particular way and order of modifying the graph. Though, in some embodiments, the modifications are only performed if the outputs of the graph are not changed by the modification.

Process 1012 may determine, at decision block 1012, whether any additional modification of the graph may be implemented to effect more changes to the graph. This may be performed by analyzing the graph and determining whether any additional changes may improve efficiency of operation of the document. If more changes are possible, the process 1000 may return to block 1006 where one or more entities may then be removed, the entities may be reordered or added. It should be appreciated that only a portion of the processing at blocks 1006-1010 may be performed on a graph.

If it is determined, at decision block 1012, that no additional changes to the graph may be effected to improve efficiency of operation of the document, process 1000 may end.

In some embodiments, the graph converted into executable components may be modified based on criteria indicative of efficiency of execution. Such modifications may involve partitioning the graph into two or more partitions based on criteria associated with computing devices available to execute the components. A deployment environment in which the partitions may be executed by comprise different types of devices having different computing capabilities and other properties. The partitions may be assigned to executed on different devices in the deployment environment.

Figure 11:
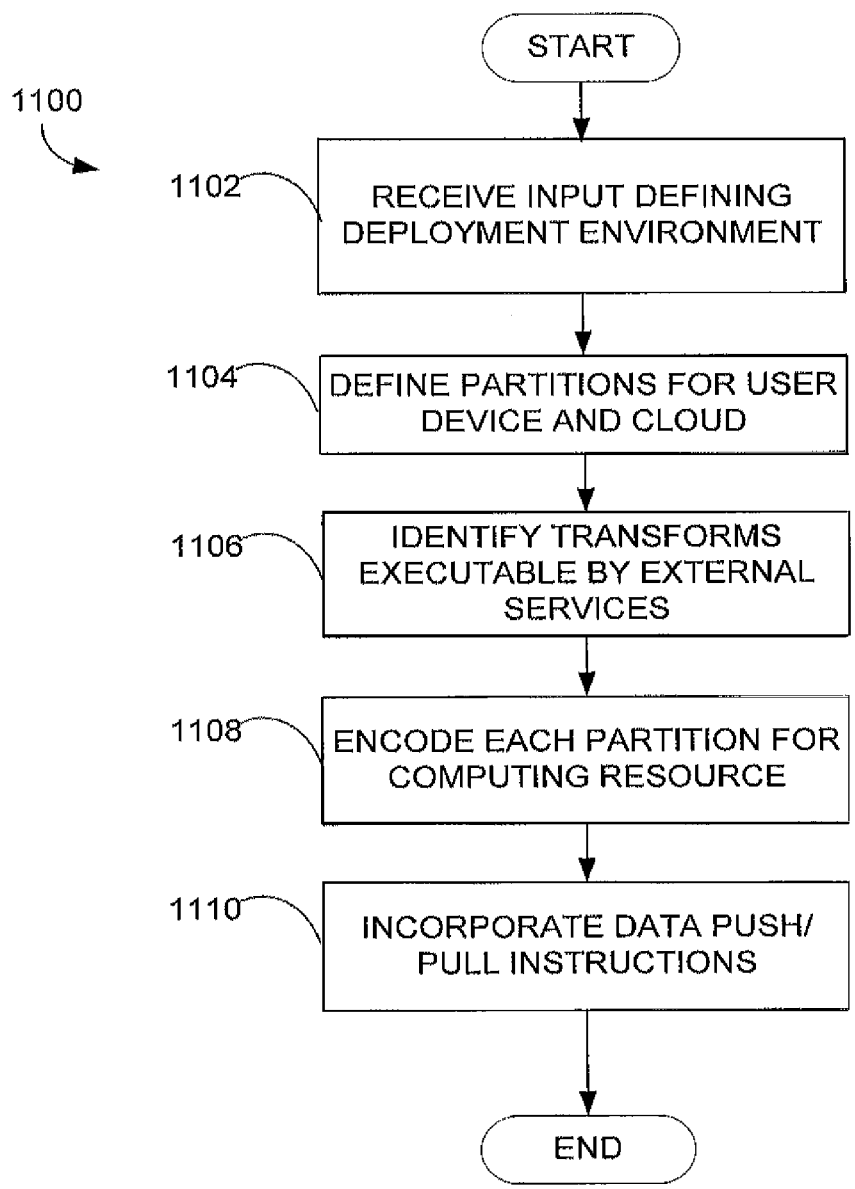
FIG. 11 is a flowchart illustrating a process of operating a document authoring tool and modifying a graph based on criteria indicative of efficiency of execution, in accordance with some embodiments.

FIG. 11 is a flowchart illustrating a process 1100 of modifying the graph based on criteria indicative of efficiency of execution. The process 1100 may start at any suitable time. For example, user input may be received initiating the process 1100. The process 1100 may start after the graph formed by entities in the interactive document has been built, as described in connection with FIG. 9. The interactive document may comprise different types of entities connected via edges indicating a data flow between the entities.

At block 1102, the document authoring tool may receive user input defining a deployment environment. The user input may be received in any suitable manner and with respect to any suitable deployment environment. For example, a user interface of a user device may allow the user to indicate the deployment environment using a suitable control.

Next, at block 1104, two or more partitions may be defined for execution on the user device and one or more devices "in the cloud." The partitions may be defined based on a number of factors. For example, the partitions may be defined based on computing capabilities of the user device and other devices in the deployment environment. Entities within the graph may be assigned to different partitions. At block 1106, process 1100 may identify in the graph one or more transforms that are executable by an external service. The external service may be a server or other suitable computing device. Such transform(s) may be converted into executable components that place a call to the external service.

The process 1100 may then continue to block 1108 where each partition may be encoded for execution on a computing resource to which the partition is assigned. In particular, entities assigned to the partition may be converted into executable components configured to executed on the computing resource.

Next, at block 1100, data push and pull instructions may be incorporated into the graph, defining a way in which entities having an input receive data through the input. The data pull and push modes are manifested at edges of the graph defining a data flow between entities in the graph.

An entity in the graph having an input may operate either in the data pull mode or in the data push mode. In the data pull mode, the entity may request data to be received at the entity's input from its predecessor entity in the graph. The request for data in the pull mode may be defined as a function call or in any suitable manner.

In the data push mode, the entity may be "pushed" data without an explicit request from that entity. The data may be pushed into an entity in number of ways. For example, a suitable interactive element (e.g., a control or other element) capable of receiving user input indicative of "pushing" the data may be presented on a user interface. An example of such entity comprises a visualization with an interaction.

It should be appreciated that processing shown at blocks at FIG. 11 may be performed at any suitable order. In some cases, the data pull and push instructions may be defined prior to defining partitions at block 1104 because the partitioning process may depend on how data is received by entities in the graph. When data is "pushed" into an entity by another entity, these entities may be assigned to the same partition.

Figure 12:
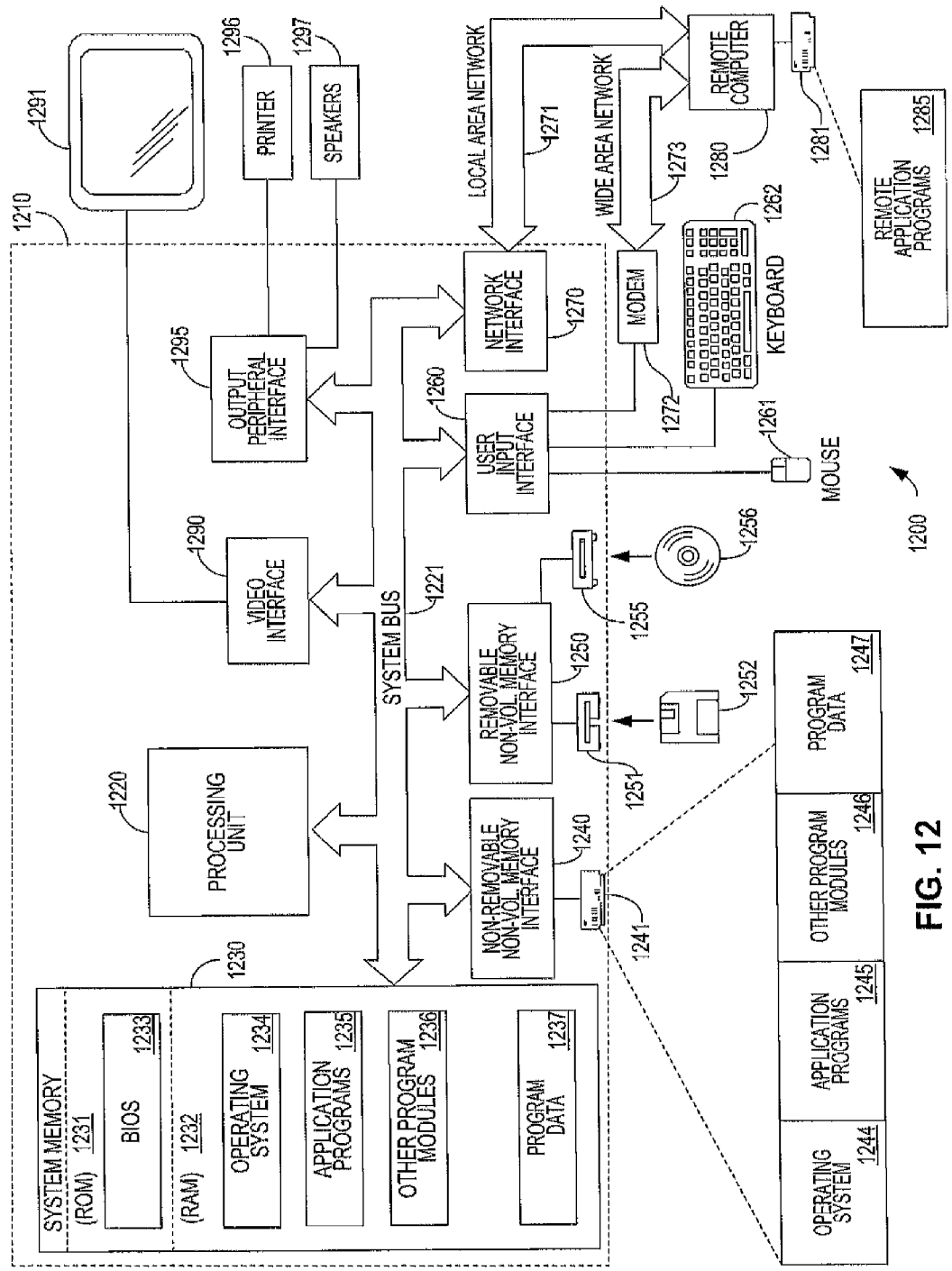
FIG. 12 is schematic diagram illustrating a computing environment in which some embodiments may be implemented.

FIG. 12 illustrates an example of a suitable computing system environment 1200 in which embodiments of the invention may be implemented. This computing environment 1200, for example, may represent an environment for a user device on which an interactive document is executed, a computing device on which a document authoring tool is executed or any other computing device used to execute any of the processes described above. The computing system environment 1200 is only one example of a suitable computing environment and is not intended to suggest any limitation as to the scope of use or functionality of the invention. Neither should the computing environment 1200 be interpreted as having any dependency or requirement relating to any one or combination of components illustrated in the exemplary operating environment 1200.

Some embodiments are operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The embodiments may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 12, an exemplary system for implementing the invention includes a general purpose computing device in the form of a computer 1210. Components of computer 1210 may include, but are not limited to, a processing unit 1220, a system memory 1230, and a system bus 1221 that couples various system components including the system memory to the processing unit 1220. The system bus 1221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 1210 typically includes a variety of computer readable media. The system memory 1230 includes computer storage media in the form of volatile and/or nonvolatile memory such as read only memory (ROM) 1231 and random access memory (RAM) 1232. A basic input/output system 1233 (BIOS), containing the basic routines that help to transfer information between elements within computer 1210, such as during start-up, is typically stored in ROM 1231. RAM 1232 typically contains data and/or program modules that are immediately accessible to and/or presently being operated on by processing unit 1220. By way of example, and not limitation, FIG. 12 illustrates operating system 1234, application programs 1235, other program modules 1236, and program data 1237.

The computer 1210 may also include other removable/non-removable, volatile/nonvolatile computer storage media. By way of example only, FIG. 12 illustrates a hard disk drive 1240 that reads from or writes to non-removable, nonvolatile magnetic media, a magnetic disk drive 1251 that reads from or writes to a removable, nonvolatile magnetic disk 1252, and an optical disk drive 1255 that reads from or writes to a removable, nonvolatile optical disk 1256 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1241 is typically connected to the system bus 1221 through a non-removable memory interface such as interface 1240, and magnetic disk drive 1251 and optical disk drive 1255 are typically connected to the system bus 1221 by a removable memory interface, such as interface 1250.

The drives and their associated computer storage media discussed above and illustrated in FIG. 12, provide storage of computer readable instructions, data structures, program modules and other data for the computer 1210. In FIG. 12, for example, hard disk drive 1241 is illustrated as storing operating system 1244, application programs 1245, other program modules 1246, and program data 1247. Note that these components can either be the same as or different from operating system 1234, application programs 1235, other program modules 1236, and program data 1237. Operating system 1244, application programs 1245, other program modules 1246, and program data 1247 are given different numbers here to illustrate that, at a minimum, they are different copies. A user may enter commands and information into the computer 1210 through input devices such as a keyboard 1262 and pointing device 1261, commonly referred to as a mouse, trackball or touch pad. Other input devices (not shown) may include a microphone, joystick, game pad, satellite dish, scanner, or the like. These and other input devices are often connected to the processing unit 1220 through a user input interface 1260 that is coupled to the system bus, but may be connected by other interface and bus structures, such as a parallel port, game port or a universal serial bus (USB). A monitor 1291 or other type of display device is also connected to the system bus 1221 via an interface, such as a video interface 1290. In addition to the monitor, computers may also include other peripheral output devices such as speakers 1297 and printer 1296, which may be connected through an output peripheral interface 1295.

The computer 1210 may operate in a networked environment using logical connections to one or more remote computers, such as a remote computer 1280. The remote computer 1280 may be a personal computer, a server, a router, a network PC, a peer device or other common network node, and typically includes many or all of the elements described above relative to the computer 1210, although only a memory storage device 1281 has been illustrated in FIG. 12. The logical connections depicted in FIG. 12 include a local area network (LAN) 1271 and a wide area network (WAN) 1273, but may also include other networks. Such networking environments are commonplace in offices, enterprise-wide computer networks, intranets and the Internet.

When used in a LAN networking environment, the computer 1210 is connected to the LAN 1271 through a network interface or adapter 1270. When used in a WAN networking environment, the computer 1210 typically includes a modem 1272 or other means for establishing communications over the WAN 1273, such as the Internet. The modem 1272, which may be internal or external, may be connected to the system bus 1221 via the user input interface 1260, or other appropriate mechanism. In a networked environment, program modules depicted relative to the computer 1210, or portions thereof, may be stored in the remote memory storage device. By way of example, and not limitation, FIG. 12 illustrates remote application programs 1285 as residing on memory device 1281. It will be appreciated that the network connections shown are exemplary and other means of establishing a communications link between the computers may be used.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the invention discussed above. The computer readable storage medium or media can be transportable, such that the program or programs stored thereon can be loaded onto one or more different computers or other processors to implement various aspects of the present invention as discussed above. As used herein, the term "non-transitory computer-readable storage medium" encompasses only a computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of operating a computing device to execute a document authoring tool that forms an interactive document, the method comprising:
   with at least one processor:
      receiving a plurality of user inputs defining elements of the interactive document, the elements comprising:
         a plurality of entities to be incorporated in the interactive document;
         a transformation indicating a relationship between input data and output data of a first entity of the plurality of entities;
         a visualization for visually representing input data of a second entity of the plurality of entities, wherein the document authoring tool selects a visualization with interactivity and represents the visualization with interactivity by a third entity and a fourth entity, the third entity comprising an entity with an input and no output and the fourth entity comprising an entity with an output and no input, wherein the third entity is separate and disconnected from the fourth entity; and
         a plurality of edges, each of the plurality of edges indicating a data flow between two of the plurality of entities; and
      verifying that the plurality of edges interconnect the plurality of entities in an acyclic graph, wherein the plurality of entities are of a plurality of types.

2. The method of claim 1, wherein:
   the document authoring tool receives user input specifying:
      a data schema;
      a source of external data;
      interactivity of the visualization with interactivity;
      an analytic; and
      a binding between data and the analytic.

3. The method of claim 2, wherein the document authoring tool represents a data source as an entity with no inputs and an output.

4. The method of claim 2, wherein the document authoring tool incorporates in the interactive document the visualization as an entity with an input and no output, the visualization representing the input visually in the interactive document.

5. The method of claim 1, further comprising:
   receiving a user input identifying a deployment environment, the deployment environment comprising a plurality of computing devices; and
   converting the user input defining the interactive document into a plurality of executable components, each of the executable components configured for execution on one of computing device of the plurality of computing devices.

6. The method of claim 1, wherein the transformation represents a set of equations.

7. At least one computer-readable storage medium having stored thereon information defining an interactive document, the at least one computer-readable storage medium being an article of manufacture, the interactive document comprising:

a plurality of entities defined by one or more user inputs;
a plurality of edges defined by one or more user inputs, each of the plurality of edges indicating a data flow between two of the plurality of entities;
a transformation defined by one or more user inputs indicating a relationship between input data and output data of a first entity of the plurality of entities; and
a visualization defined by one or more user inputs for visually representing input data of a second entity of the plurality of entities, wherein the visualization is represented by a third entity and a fourth entity, the third entity comprising an entity with an input and no output and the fourth entity comprising an entity with an output and no input, the third entity being separate and disconnected from the fourth entity.

8. The computer-readable storage medium of claim 7, wherein the document represents:
at least one data schema;
at least one source of external data;
interactivity of at least one visualization;
at least one analytic; and
at least one binding between data and the at least one analytic.

9. The computer-readable storage medium of claim 7, wherein:
one of the plurality of entities represents an external data source, and the one of the plurality of entities comprising computer executable instructions for querying the external data source.

10. The computer-readable storage medium of claim 7, wherein:
one of the plurality of entities comprises computer executable instructions for receiving data in response to user interaction with a graphical object displayed on a graphical user interface.

11. The computer-readable storage medium of claim 7, wherein:
one of the plurality of entities comprises a table or a nested table.

12. The computer-readable storage medium of claim 7, wherein:
the interactive document is modified by adding an entity automatically in the interactive document based on analysis of the interactive document.

13. The computer-readable storage medium of claim 7, wherein:
the transformation represents a set of equations.

14. At least one computer-readable storage medium, the at least one computer-readable storage medium being an article of manufacture and comprising computer-executable instructions that, when executed, perform a method of operating a document authoring tool that authors an interactive document, the method comprising:
receiving user input defining elements of the interactive document, comprising:
a plurality of entities to be incorporated in the interactive document;
a transformation indicating a relationship between input data and output data of a first entity of the plurality of entities;
an interactive graphical object for visually representing input data of a second entity of the plurality of entities, wherein the document authoring tool selects the interactive graphical object which is represented by a third entity and a fourth entity, the third entity comprising an entity with an input and no output and the fourth entity comprising an entity with an output and no input, the third entity being separate and disconnected from the fourth entity;
an entity representing a source of external data;
a set of equations; and
a plurality of edges, each of the edges indicating a data flow between two of the plurality of entities; and
verifying that the plurality of edges interconnect the plurality of entities in an acyclic graph.

15. The computer-readable storage medium of claim 14, wherein the method further comprises:
receiving user input identifying the interactive graphical object; and
generating, as representation of the interactive graphical object in the interactive document:
the third entity representing the interactive graphical object, the input of the third entity representing data that configures a visual appearance of the interactive graphical object when rendered on a graphical user interface; and
the fourth entity representing user interaction with the interactive graphical object, the output of the fourth entity representing results of the user interaction with the interactive graphical object when rendered on the graphical user interface.

16. The computer-readable storage medium of claim 15, wherein at least a portion of the plurality of edges interconnect entities of different types.

17. The computer-readable storage medium of claim 14, wherein:
receiving a user input defining an external data source comprises receiving user input defining a query-able source; and
the method further comprises recording as part of the interactive document information indicating a query to the query-able data source.

18. The computer-readable storage medium of claim 14, wherein the method further comprises:
receiving a user input identifying a deployment environment, the deployment environment comprising a plurality of computing devices; and
converting the user input defining the interactive document into a plurality of executable components, each of the executable components configured for execution on a computing device of the plurality of computing devices.

19. The computer-readable storage medium of claim 18, wherein:
each executable component in a first portion of the executable components pulls data from another executable component; and
each executable component in a second portion of the executable components pushes data to another executable component.

20. The computer-readable storage medium of claim 14, wherein:
the method further comprises receiving a data schema; and
the data schema is applied to data in multiple entities of the plurality of entities.

* * * * *